US012645077B2

(12) United States Patent　　　　(10) Patent No.:　US 12,645,077 B2
Lee et al.　　　　　　　　　　　　　(45) Date of Patent:　　　Jun. 2, 2026

---

(54) AUGMENTED REALITY CONTENT PROVIDING DEVICE

(71) Applicant: Samsung Display Co., LTD., Yongin-si (KR)

(72) Inventors: Tae Hee Lee, Hwaseong-si (KR); Byung Choon Yang, Seoul (KR); Joo Woan Cho, Seongnam-si (KR); Byeong Hwa Choi, Seoul (KR); Hae Yun Choi, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 869 days.

(21) Appl. No.: 17/821,402

(22) Filed: Aug. 22, 2022

(65) Prior Publication Data

US 2023/0082737 A1　　Mar. 16, 2023

(30) Foreign Application Priority Data

Sep. 16, 2021　(KR) ........................ 10-2021-0123755

(51) Int. Cl.
　　*G02B 27/00*　　　(2006.01)
　　*G02B 27/01*　　　(2006.01)
(52) U.S. Cl.
　　CPC .. *G02B 27/0172* (2013.01); *G02B 2027/0178* (2013.01)
(58) Field of Classification Search
　　CPC ........ G02B 27/0172; G02B 2027/0178; G02B 30/34; G02B 27/4272; G02B 2027/0112; G02B 2027/0134; G02B 27/01; G02B 27/0101; G02B 27/0103; G02B 27/0149; G02B 27/017; G02B 27/0176; G02B 27/0179; G02B 27/0189; G02B 2027/0105; G02B 2027/0107; G02B 2027/0109; G02B 2027/011; G02B 2027/0114; G02B 2027/0116; G02B 2027/0118; G02B 2027/012; G02B 2027/0121; G02B 2027/0123; G02B 2027/0125; G02B 2027/0127; G02B 2027/0129;

(Continued)

(56) References Cited

U.S. PATENT DOCUMENTS

| | | |
|---|---|---|
| 10,942,355 B2 | 3/2021 | Trail et al. |
| 11,112,607 B2 | 9/2021 | Trail et al. |
| 11,112,608 B2 | 9/2021 | Trail et al. |
| 11,177,418 B2 | 11/2021 | Kim et al. |
| 11,231,588 B1 | 1/2022 | Trail et al. |

(Continued)

FOREIGN PATENT DOCUMENTS

| | | |
|---|---|---|
| JP | 6624617 B2 | 12/2019 |
| KR | 10-1660519 B1 | 9/2016 |

(Continued)

*Primary Examiner* — Henry Duong
(74) *Attorney, Agent, or Firm* — Womble Bond Dickinson (US) LLP

(57) ABSTRACT

The present disclosure relates to an augmented reality (AR)-content-providing device that can further increase user satisfaction and its utilization by realizing AR content of a 3D image. An AR-content-providing device comprises at least one display module configured to separately display a background image and a main image, and at least one optical member including respective display light paths of the background image and the main image so that the background image and the main image are superimposed on each other to be perceived as a three-dimensional (3D) image by a user's eyes.

20 Claims, 21 Drawing Sheets

(58) Field of Classification Search

CPC ...... G02B 2027/013; G02B 2027/0132; G02B
2027/0136; G02B 2027/0138; G02B
2027/014; G02B 2027/0141; G02B
2027/0143; G02B 2027/0145; G02B
2027/0147; G02B 2027/015; G02B
2027/0152; G02B 2027/0154; G02B
2027/0156; G02B 2027/0158; G02B
2027/0159; G02B 2027/0161; G02B
2027/0163; G02B 2027/0165; G02B
2027/0167; G02B 2027/0169; G02B
2027/0174; G02B 2027/0181; G02B
2027/0183; G02B 2027/0185; G02B
2027/0187; G02B 2027/019; G02B
2027/0192; G02B 2027/0194; G02B
2027/0196; G02B 2027/0198

USPC ........................................................ 359/630

See application file for complete search history.

(56) References Cited

U.S. PATENT DOCUMENTS

| | | | |
|---|---|---|---|
| 11,493,767 | B1 | 11/2022 | Trail et al. |
| 11,675,199 | B1 | 6/2023 | Trail et al. |
| 12,443,019 | B2 | 10/2025 | Suzuki et al. |
| 2017/0309698 | A1 | 10/2017 | Bower et al. |
| 2018/0246333 | A1 | 8/2018 | Cheng et al. |
| 2018/0299678 | A1 | 10/2018 | Singer et al. |
| 2021/0141212 | A1* | 5/2021 | Jacoby .............. G02B 27/0172 |
| 2025/0389939 | A1 | 12/2025 | Suzuki et al. |

FOREIGN PATENT DOCUMENTS

| | | |
|---|---|---|
| KR | 10-2018-0118488 A | 10/2018 |
| KR | 10-2020-0042058 A | 4/2020 |
| KR | 10-2020-0103678 A | 9/2020 |
| KR | 10-2021-0028931 A | 3/2021 |
| KR | 10-2021-0098446 A | 8/2021 |

* cited by examiner

110(a)

A

PDA1

DA ⎱
    ⎰ 212
NDA ⎱

PDA2

DR2

DR1

DR3

(a)

(b)

(a)

(b)

AUGMENTED REALITY CONTENT PROVIDING DEVICE

CROSS-REFERENCE TO RELATED APPLICATION

This application claims priority to, and the benefit of, Korean Patent Application No. 10-2021-0123755, filed on Sep. 16, 2021, in the Korean Intellectual Property Office, the disclosure of which is incorporated herein in its entirety by reference.

BACKGROUND

1. Field

The present disclosure relates to an augmented reality (AR) content providing device.

2. Description of the Related Art

Recently, as electronic devices and display devices that can realize virtual reality (VR) are developed, interest in these devices is increasing. As a next step in virtual reality, a technology that can realize augmented reality (AR) and mixed reality (MR) is also being researched.

Unlike virtual reality that is based on a completely virtual world, augmented reality is a display technology that further increases the effect of reality by superimposing virtual objects or image information on the environment of a real world.

While virtual reality is applied only to fields such as games and virtual experiences, augmented reality can be variously applied to the real environment. For example, augmented reality is drawing attention as a next-generation display technology suitable for a ubiquitous environment or an Internet of things (IoT) environment. Such augmented reality can be considered as an example of mixed reality in that it mixes and shows additional information of the real world and the virtual world.

SUMMARY

Aspects of the present disclosure provide an augmented reality (AR) content providing device that can realize AR content of a three-dimensional (3D) image.

Aspects of the present disclosure also provide an AR-content-providing device that can be applied in various forms to transparent or translucent lenses or glasses.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to some embodiments of the disclosure, an augmented reality (AR)-content-providing device includes at least one display module configured to separately display a background image and a main image, and at least one optical member including respective display light paths of the background image and the main image so that the background image and the main image are superimposed on each other to be perceived as a three-dimensional (3D) image by a user's eyes.

The at least one optical member may include a first optical panel forming the display light path of the main image, and a second optical panel forming the display light path of the background image, wherein the first and second optical panels include a flat plate shape and overlap each other so that a plane direction faces and corresponds to a direction of the user's eyes.

The first optical panel may include at least one first grating coupler adjacent at least a part of a front surface or a rear surface thereof to form an optical waveguide of the display light path of the main image, wherein the second optical panel includes at least one second grating coupler adjacent at least a part of a front surface or a rear surface thereof to form an optical waveguide of the display light path of the background image.

An area or a width of the at least one first grating coupler inside the first optical panel may be less than an area or a width of the at least one second grating coupler inside the second optical panel so that a light refraction width of the first optical panel is less than a light refraction width of the second optical panel.

The first optical panel may further include first multi-stage reflective members forming a light refraction path with the at least one first grating coupler so that the display light path of the main image is refracted in the direction of the user's eyes, wherein the second optical panel further includes second multi-stage reflective members forming a light refraction path with the at least one second grating coupler so that the display light path of the background image is refracted in the direction of the user's eyes.

A thickness of the first optical panel may be less than a thickness of the second optical panel so that the display light path of the main image is shorter than the display light path of the background image.

The second optical panel may overlap a rear surface of the first optical panel, wherein a distance between the first and second optical panels is equal to or less than a thickness of the first optical panel or a thickness of the second optical panel.

An area or a width of the first optical panel may be less than an area or a width of the second optical panel so that the display light path of the main image is shorter than the display light path of the background image.

The at least one display module may be in a front circumferential direction area of, on a side of, or diagonally in front of, the first and second optical panels to provide the main image and the background image to front peripheral areas of the first and second optical panels, respectively.

The at least one display module may include a first image display device on a circuit board to display the main image in a direction of the first optical panel, thereby providing the main image to the first optical panel, and a second image display device side by side with the first image display device and on the circuit board to display the background image in a direction of the second optical panel, thereby providing the background image to the second optical panel.

The at least one display module may be formed such that the main image and the background image are configured to be emitted at respective emission angles, such that the main image is incident on the first optical panel in a diagonal lateral direction, and such that the background image is straightly incident on a front peripheral area of the second optical panel.

The first and second image display devices may be configured to display the main image and the background image in different respective solid colors, or the first image display device may be configured to display the main image by combining red, green and blue colors, and wherein the second image display device is configured to display the background image only in any one solid color among the red, green, and blue colors.

The first and second image display devices may be configured to be set to different respective levels of at least one of resolution, display luminance, and brightness, and are configured to be set to different respective levels of at least one of chromaticity, chroma, and color sense.

The first and second image display devices may include a partition wall on a substrate in an RGBG matrix structure, light-emitting elements in respective light-emitting areas arranged in the RGBG matrix structure, and extending in a thickness direction of the substrate, a base resin in the light-emitting areas, and optical patterns on at least one of the light-emitting areas.

The light-emitting areas may include first through third light-emitting areas or first through fourth light-emitting areas in each pixel area.

The first light-emitting area may include a first light-emitting element for emitting first light in a wavelength band that realizes any one color of the red, green and blue colors, wherein the second light-emitting area includes a second light-emitting element for emitting second light in a wavelength band that realizes any one color that is different from the first light among the red, green and blue colors, wherein the third light-emitting area includes a third light-emitting element for emitting third light in a wavelength band that realizes any one color that is different from the first light and the second light among the red, green and blue colors, and wherein the fourth light-emitting area includes a fourth light-emitting element for emitting fourth light in a same wavelength band as any one of the first light, the second light, and the third light.

The first through fourth light-emitting areas may have a same size or planar area, wherein a distance between the first light-emitting area and the second light-emitting area, a distance between the second light-emitting area and the third light-emitting area, a distance between the first light-emitting area and the third light-emitting area, and a distance between the third light-emitting area and the fourth light-emitting area, are the same.

Respective ones of the first through fourth light-emitting areas may have different sizes or planar areas.

According to some embodiments of the disclosure, an AR-content-providing device includes a support frame supporting at least one transparent lens, at least one display module configured to display a background image and a main image separately, at least one optical member integrally formed with the at least one transparent lens, and forming a display light path of the background image and a display light path of the main image, so that the background image and the main image displayed separately on the at least one display module are superimposed on each other, and a control module configured to separate image data of AR content into background image data and main image data, and configured to provide the background image data and the main image data to the at least one display module.

The at least one optical member may be embedded in a surface of, and is integrally formed with, the transparent lens including integrated left and right sides, or is embedded in a surface of, and is integrally formed with, the transparent lens including separated first and second transparent lenses, wherein the at least one optical member includes the display light path of the background image and the display light path of the main image so that the background image and the main image are superimposed on each other.

An AR-content-providing device according to some embodiments of the present disclosure can further increase utilization thereof and user satisfaction by realizing AR content of a 3D image.

In addition, the AR-content-providing device according to some embodiments of the present disclosure can be applied in various forms to transparent or translucent lenses or glasses. Therefore, the application efficiency of the AR-content-providing device can be improved.

However, the aspects of the present disclosure are not restricted to those set forth herein. The above and other effects of the present disclosure will become more apparent to one of daily skill in the art to which the present disclosure pertains by referencing the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
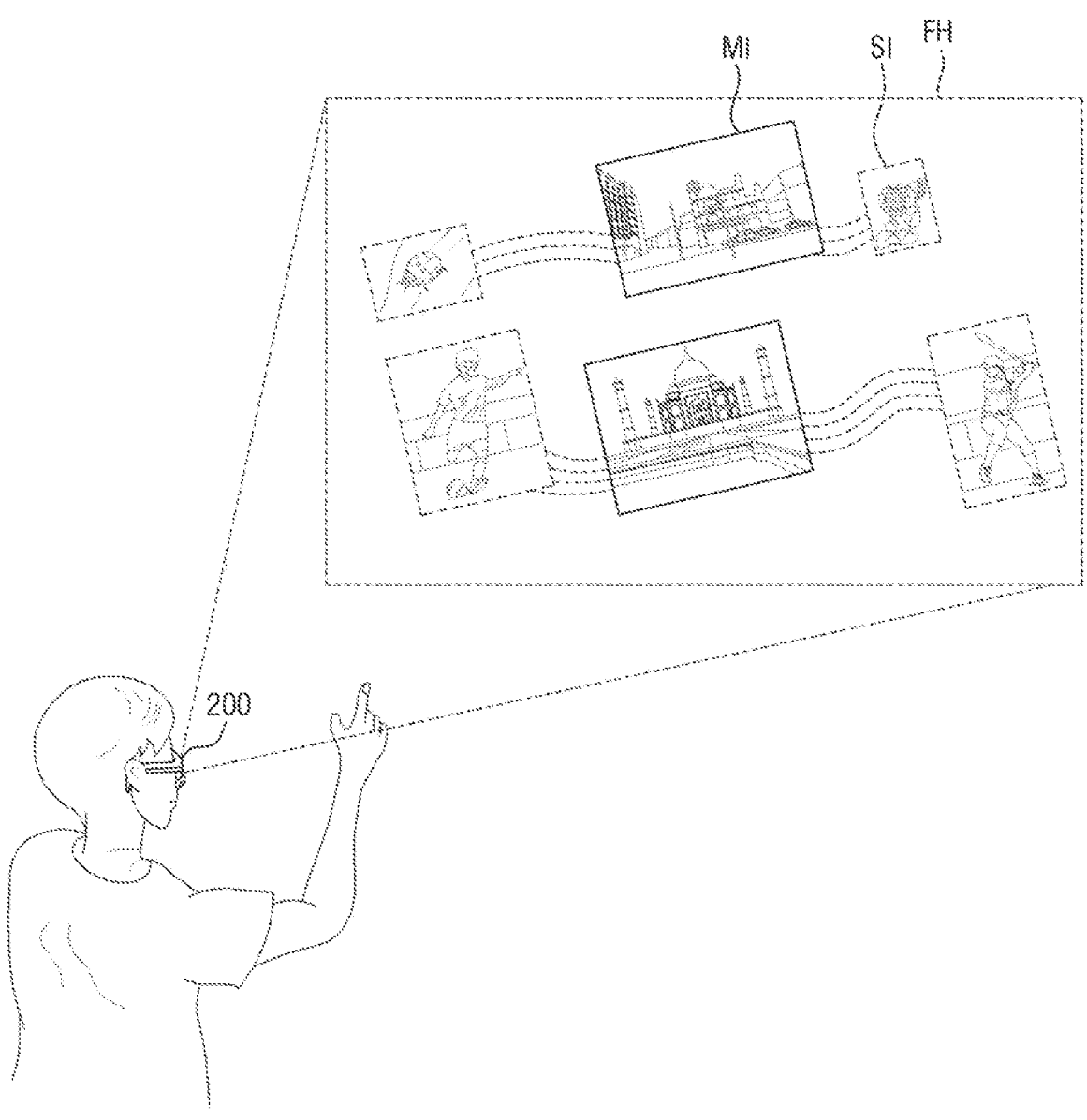
FIG. 1 is a view illustrating an augmented reality (AR)-content-providing device according to some embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, "or" generally means "and/or," and the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Each of the features of the various embodiments of the present disclosure may be combined or combined with each other, in part or in whole, and technically various interlocking and driving are possible. Each of the embodiments may be implemented independently of each other, or respective ones of the embodiments may be implemented together in an association.

Figure 2:
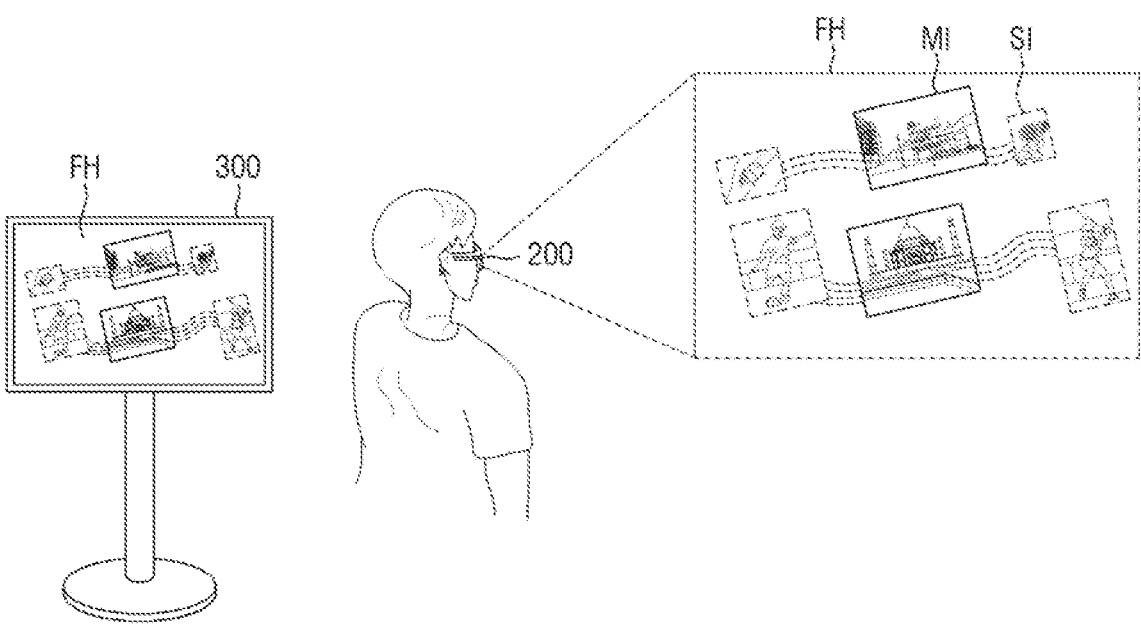
FIG. 2 is another view illustrating an application example of the AR-content-providing device according to some embodiments of the present disclosure.

FIG. 1 is a view illustrating an augmented reality (AR)-content-providing device 200 according to some embodiments of the present disclosure. FIG. 2 is another view illustrating an application example of the AR-content-providing device 200 according to some embodiments of the present disclosure.

Referring to FIG. 1, the AR-content-providing device 200 realizes AR content of a three-dimensional (3D) image FH in a form in which a main image MI is superimposed on a background image SI. For example, the AR-content-providing device 200 separates image data of AR content stored in advance, or externally delivered/received from the outside, into background image data and main image data according to a corresponding program (e.g., a preset program), and stores the background image data and the main image data. The AR-content-providing device 200 may also receive and store image data of AR content separated into background image data and main image data.

The AR-content-providing device 200 may display the AR content of the 3D image FH in the form in which the main image MI is superimposed on the background image SI under a user's control of the display of the 3D image FH. In addition, the AR-content-providing device 200 may change and display the sound effect and vibration effect of the AR content to correspond to the AR content display timing of the 3D image FH.

The AR-content-providing device 200 may include at least one display module that displays the background image SI and the main image MI separately. In addition, the AR-content-providing device 200 may include an optical member, or optical panel, that forms a display path (or a light path) of each of the background image SI and the main image MI, so that the background image SI and the main image MI displayed separately on the display module may be perceived by a user's eyes as being superimposed on each other. Detailed elements of the AR-content-providing device 200 will be described in more detail later with reference to the accompanying drawings.

The AR-content-providing device 200 may be integrally formed with a glasses-type frame that can be easily carried, worn, or taken off by a user, or may be mounted or assembled on the glasses-type frame. The AR-content-providing device 200 applied to a glasses-type frame provides the 3D image FH of the AR content to a user's eyes through a transparent lens so that the 3D image FH of the AR content is superimposed on a real image seen by the user's eyes through the transparent lens. The AR content in the present disclosure may include two-dimensional (2D) or 3D image content, which is a combination of graphics images, photographed images, text, and/or sound content.

Referring to FIG. 2, the AR-content-providing device 200 may perform wireless communication with a separate content display device 300, such as a tablet personal computer (PC) or a flat-panel image display device, to transmit the image data of the AR content to the separate content display device 300. Accordingly, the content display device 300 may display the same AR content of the 3D image FH as the AR-content-providing device 200.

At least one content display device 300 may be applied to smartphones, tablet mobile communication devices, such as tablet PCs, personal digital assistants (PDAs), portable multimedia players (PMPs), televisions, game machines, wristwatch-type electronic devices, head mounted displays, monitors of PCs, notebook computers, flat-panel image display devices, car navigation systems, car dashboards, digital cameras, camcorders, external billboards, electronic boards, medical devices, examination devices, various home appliances, such as refrigerators and washing machines, or Internet of things (IoT) devices. In the present specification, a flat-panel image display device used for learning or lecturing will be described as an example of the content display device 300, and the flat-panel image display device may have high resolution to ultra-high resolution such as HD, UHD, 4K, and 8K.

A flat-panel image display device used as at least one content display device 300 may be classified as an organic light-emitting display device (OLED), an inorganic electroluminescent (EL) display device, a quantum dot light-emitting display device (QED), a micro-light-emitting diode (LED) display device, a nano-LED display device, a plasma display panel (PDP), a field emission display device (FED), a cathode ray tube (CRT) display device, a liquid crystal display device (LCD), or an electrophoretic display device (EPD) according to a display method. A micro-LED display device will be described below as an example of the content display device 300. Unless particular distinction is suitable, a micro-LED display device applied to embodiments will be simply shortened to a display device. However, embodiments are not limited to the micro-LED display device, and other content display devices 300 listed above or known in the art are also applicable within the technical spirit of the present disclosure.

Figure 3:
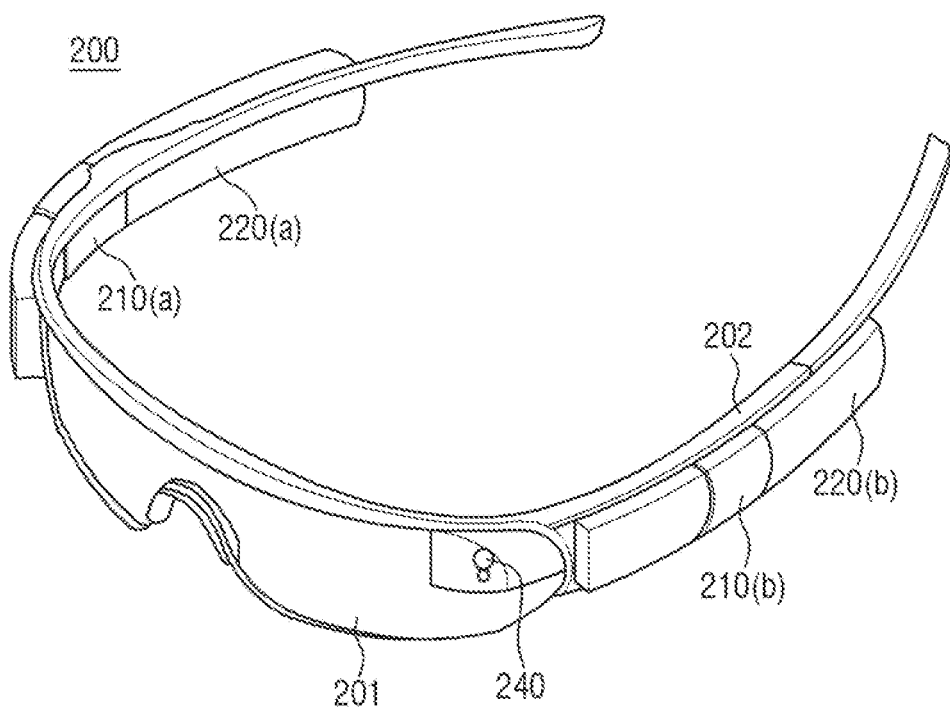
FIG. 3 is a detailed perspective view of the AR-content-providing device applied in the form of glasses according to some embodiments of the present disclosure.
Figure 4:
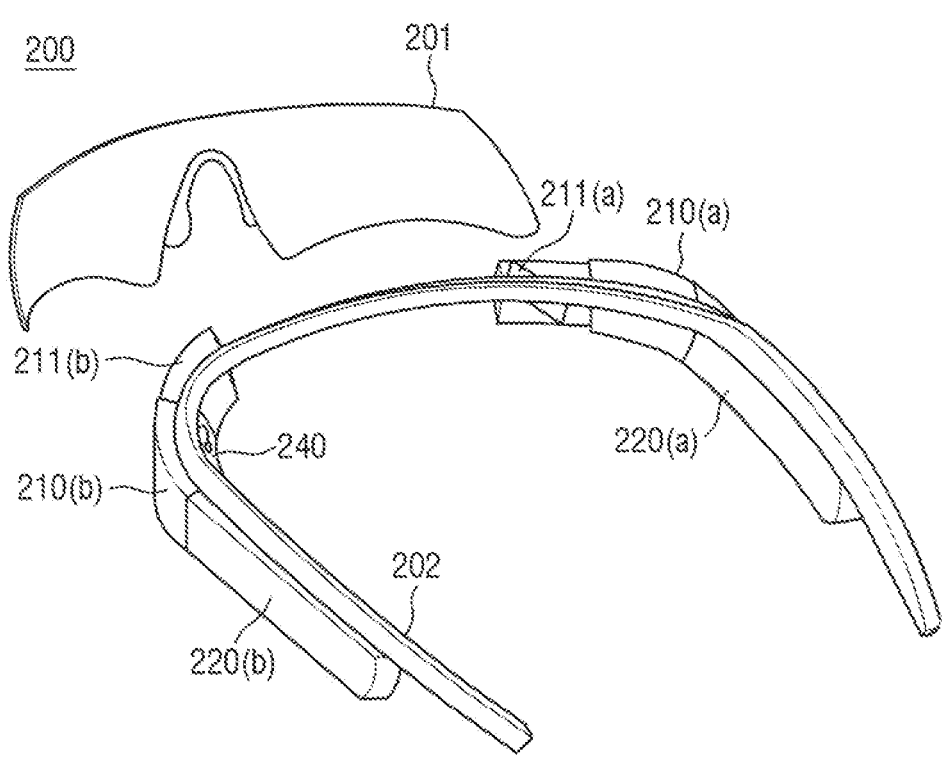
FIG. 4 is a rear exploded perspective view of the AR-content-providing device illustrated in FIG. 2.
Figure 5:
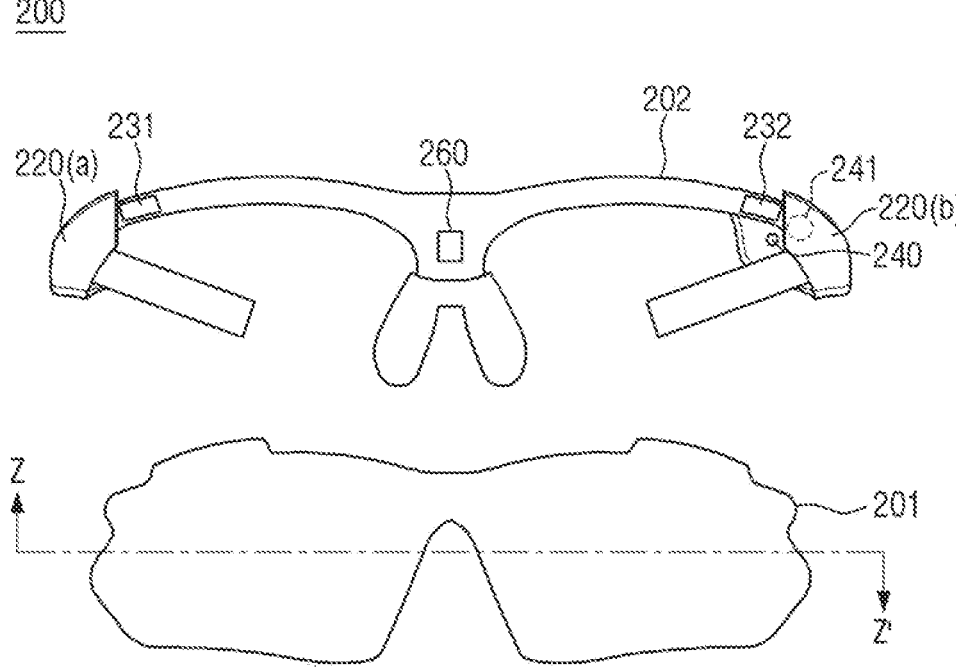
FIG. 5 is a front exploded perspective view of the AR-content-providing device illustrated in FIGS. 2 and 3.

FIG. 3 is a detailed perspective view of the AR-content-providing device 200 applied in the form of glasses according to some embodiments of the present disclosure. FIG. 4 is a rear exploded perspective view of the AR-content-providing device 200 illustrated in FIGS. 2 and 3. FIG. 5 is a front exploded perspective view of the AR-content-providing device 200 illustrated in FIGS. 2 and 3. In addition, FIG. 6 is a top view of a cross section cut along the line Z-Z' of FIG. 5 as seen from above.

Referring to FIGS. 3 through 6, the AR-content-providing device 200 may be formed in the form of glasses, and may be integrally formed with at least one transparent lens 201 and with a support frame 202 supporting the transparent lens 201. Here, a sensing module 240 and one or more control modules 220(*a*) and 220(*b*) may be further formed on the support frame 202.

Figure 6:
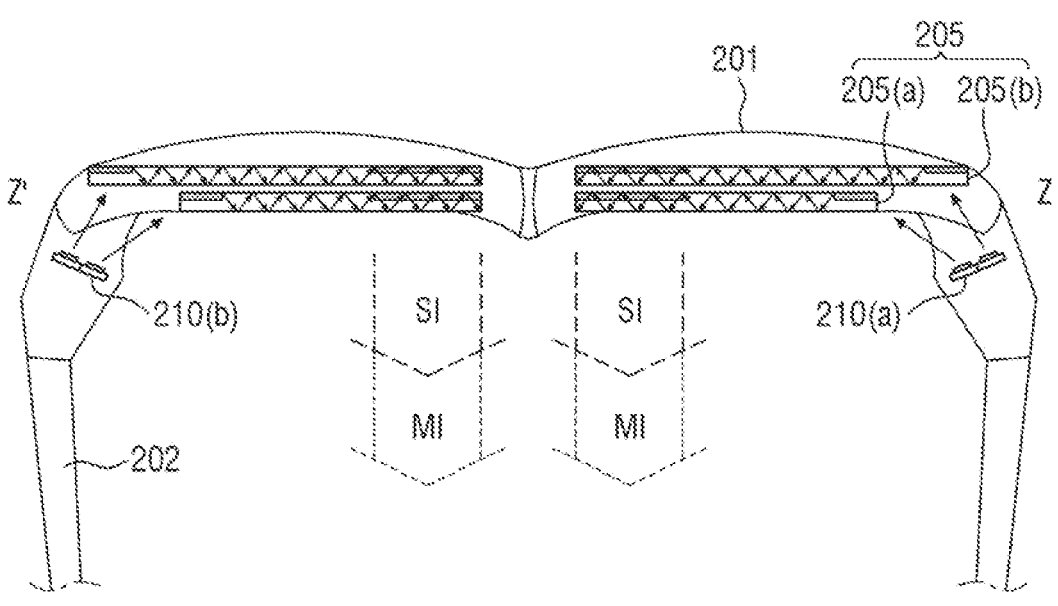
FIG. 6 is a top view of a cross section cut along the line Z-Z' of FIG. 5 as seen from above.

As illustrated in FIG. 6, the AR-content-providing device 200 includes one or more display modules 210(*a*) and 210(*b*), each displaying a background image SI and a main image MI separately. In addition, the AR-content-providing device 200 includes one or more optical members/optical panels 205, each forming a display light path of each of the background image SI and the main image MI, so that the background image SI and the main image MI displayed separately on a display module 210(*a*) or 210(*b*) can be perceived by a user's eyes as being superimposed on each other.

The support frame 202 may be formed in the form of glasses including an eyeglass frame, which supports an edge of the transparent lens 201, and eyeglass frame legs. The support frame 202 is not necessarily formed in the form of glasses, and also may be formed in the form of goggles including the transparent lens 201 or in a head mounted form.

The display modules 210(*a*) and 210(*b*) may be integrally formed or assembled on one side or on both sides of the support frame 202. In FIG. 6, first and second display modules 210(*a*) and 210(*b*) are integrally formed on respective sides of the support frame 202.

Each of the display modules 210(*a*) and 210(*b*) may include a micro-LED display device, a nano-LED display device, an OLED, an inorganic EL display device, a QED, a CRT display device, an LCD, or the like. A case where each of the display modules 210(*a*) and 210(*b*) includes a micro-LED display device will be described below as an example. Unless particular distinction is suitable, a micro-LED display device applied to embodiments will be simply shortened to a display device. However, embodiments are not limited to the micro-LED display device, and other display devices listed above or known in the art are also applicable within the technical spirit of the present disclosure.

The transparent lens 201 may have left and right sides integrated, or may consist of first and second transparent lenses separately formed on the left side and the right side. The transparent lens 201 having the left and right sides integrated or separated into the first and second transparent lenses may be formed of glass or plastic to be transparent or translucent. Therefore, a user can see an image of reality through the transparent lens 201 having the left and right sides integrated or separated into the first and second transparent lenses. Here, the transparent lens 201, that is, the integrated lens or the first and second transparent lenses, may have refractive power in consideration of the user's eyesight (e.g., may be corrective lenses).

The optical members 205 may be integrally formed with the transparent lens 201 having the left and right sides integrated or with the first and second transparent lenses separately formed on the left side and the right side. For example, the optical members 205 may be embedded in an entirety of, or in a part of, a surface of the integrated transparent lens 201, and thus may be integrally formed with the transparent lens 201. Alternatively, the optical members 205 may be embedded in the whole of/an entirety of, or in a part of, surfaces of the first and second transparent lenses, respectively, and thus may be integrally formed with the first and second transparent lenses, respectively. Each of the optical members 205 forms the display light path of each of the background image SI and the main image MI, so that the background image SI and the main image MI displayed separately on a display module 210(*a*) or 210(*b*) can be perceived by a user's eyes as being superimposed on each other.

The sensing module 240 may be assembled with, or integrally formed with, the support frame 202 to sense a distance (or a depth) from an object in front of the support frame 202, illuminance, and a movement direction, movement distance, tilt, etc. of the support frame 202. To this end, the sensing module 240 includes a depth sensor 241, such as an infrared sensor or a LiDAR sensor, and an image sensor 260, such as a camera. In addition, the sensing module 240 may further include first and second biosensors 231 and 232 that detect motion information of a user's eyeballs or pupils.

The control modules 220(*a*) and 220(*b*) may be assembled on at least one side of the support frame 202 together with the display modules 210(*a*) and 210(*b*), or may be integrally formed with the support frame 202.

Each of the control modules 220(*a*) and 220(*b*) separates image data of AR content stored in advance, or received from the outside, into background image data and main image data according to a corresponding program (e.g., a preset program), and stores the background image data and the main image data. The AR-content-providing device 200 may also receive and store image data of AR content separated into background image data and main image data. Then, each of the control modules 220(*a*) and 220(*b*) supplies the background image data and the main image data, which are separated from each other, to a display module 210(*a*) or 210(*b*). In addition, each of the control modules 220(*a*) and 220(*b*) controls the display module 210(*a*) or 210(*b*) to display the background image and the main image data.

Figure 7:
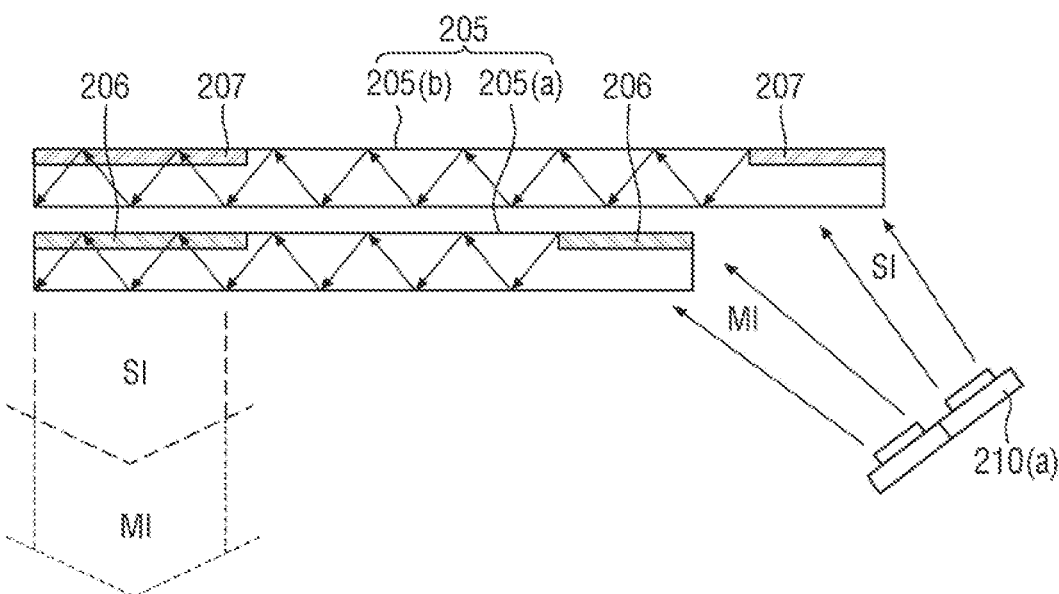
FIG. 7 illustrates the configuration of the AR-content-providing device according to some embodiments of the present disclosure.

FIG. 7 illustrates the configuration of the AR-content-providing device 200 according to some embodiments of the present disclosure.

Referring to FIG. 7, each of the display modules 210(*a*) and 210(*b*) receives background image data and main image data from a control module 220(*a*) or 220(*b*), and displays a background image SI and a main image MI separately. Each of the display modules 210(*a*) and 210(*b*) may be located to provide and display the background image SI and the main image MI in the direction of an optical member 205.

Each of the display modules 210(*a*) and 210(*b*) may display each of the background image SI and the main image MI in at least any one direction among a direction toward at least one side of an optical member 205, a diagonal direction, a front circumferential direction, a rear circumferential direction, and a direction toward an upper surface or a lower surface of the optical member 205.

Each of the optical members 205 may form a display path (or a light path) of each of the background image SI and the main image MI, so that the background image SI and the main image MI displayed separately on a display module 210(*a*) or 210(*b*) are superimposed on each other. Accordingly, the background image SI and the main image MI may be perceived by a user's eyes as being superimposed on each other. To this end, each of the optical members 205 may include a first optical panel 205(*a*), which forms the display light path of the main image MI displayed on a display module 210(*a*) or 210(*b*), and a second optical panel 205(*b*), which forms the display light path of the background image SI displayed on the display module 210(*a*) or 210(*b*).

The first and second optical panels 205(*a*) and 205(*b*) may be formed in the same flat plate shape, and may overlap each other so that a plane direction faces and corresponds to a user's eye direction. The second optical panel 205(*b*) may overlap a rear surface of the first optical panel 205(*a*). Alternatively, the second optical panel 205(*b*) may overlap a front surface of the first optical panel 205(*a*).

The first optical panel 205(*a*) may be made of transparent or translucent glass or acryl, and may be formed in the shape of a circle, a quadrangle, or a polygonal plane. The first optical panel 205(*a*) includes one or more first grating couplers 206 formed on at least a part of the front surface or the rear surface to form an optical waveguide so that the display light path of the main image MI is changed. As indicated by arrows, the first optical panel 205(*a*) is formed such that display light of the main image MI incident in at least one direction is refracted in a corresponding direction (e.g., a preset direction) by a surface of the first optical panel 205(*a*) and an angle of the first grating couplers 206 to reach a user's eyes.

The second optical panel 205(*b*) may be made of transparent or translucent glass or acryl, and may be formed in the shape of a circle, a quadrangle, or a polygonal plane to correspond to the first optical panel 205(*a*). The second optical panel 205(*b*) includes one or more second grating couplers 207 formed on at least a part of a front surface or a rear surface to form an optical waveguide so that the display light path of the background image SI is changed. As indicated by arrows, the second optical panel 205(*b*) is formed such that display light of the background image SI incident in at least one direction is refracted in a corresponding direction (e.g., a preset direction) by a surface of the second optical panel 205(*b*) and an angle of the second grating couplers 207 to reach the user's eyes.

Figure 8:
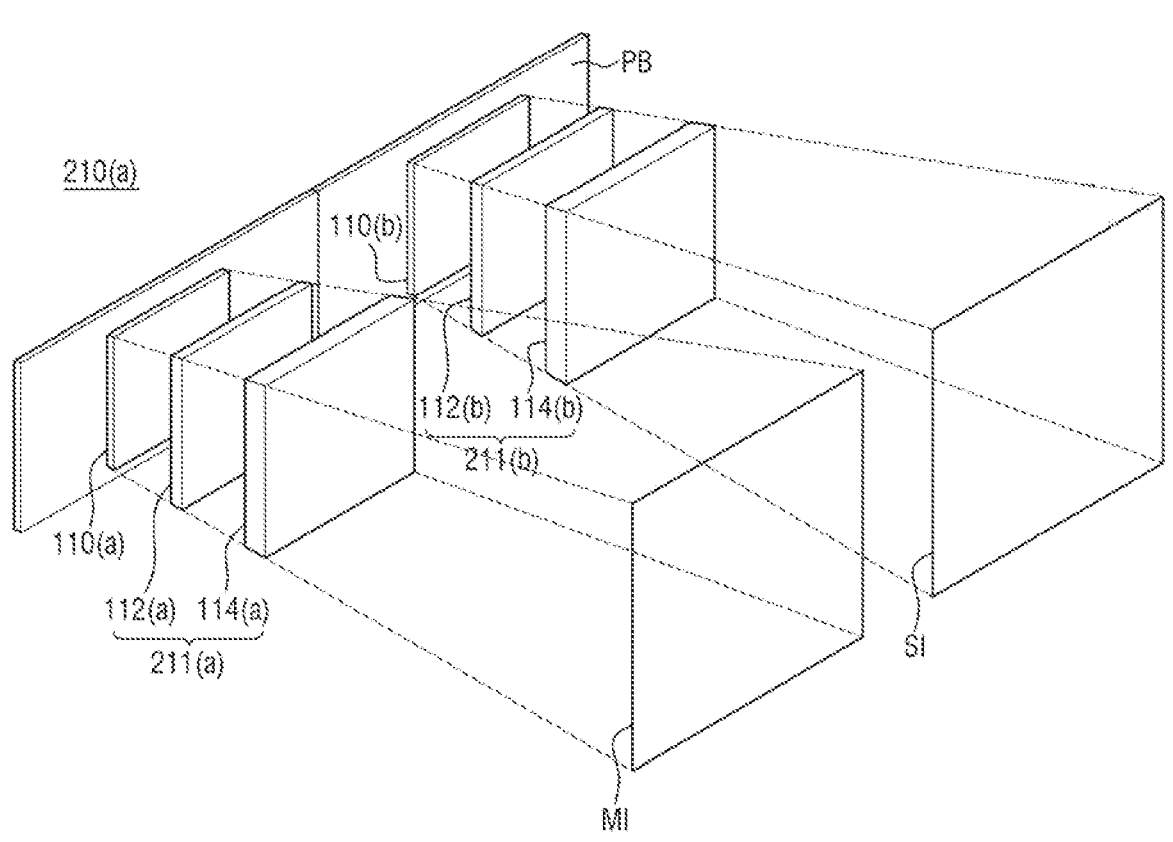
FIG. 8 schematically illustrates the configuration of a first display module of the AR-content-providing device illustrated in FIG. 7.

FIG. 8 schematically illustrates the configuration of the first display module 210(*a*) of the AR-content-providing device 200 illustrated in FIG. 7.

Referring to FIG. 8, the first display module 210(*a*) among the display modules 210(*a*) and 210(*b*) includes a first image display device 110(*a*) and a second image display device 110(*b*).

The first image display device 110(*a*) is located on a circuit board PB to display a main image MI in the direction of the first optical panel 205(*a*) of an optical member 205, thereby providing display light of the main image MI to the first optical panel 205(*a*).

The second image display device 110(*b*) is located side by side with the first image display device 110(*a*) on the circuit board PB to display a background image SI in the direction of the second optical panel 205(b) of the optical member 205, thereby providing display light of the background image SI to the second optical panel 205(b).

The first display module 210(a) may further include a first image transmission member 211(a), which may provide the display light of the main image MI of the first image display device 110(a) toward the first optical panel 205(a), and a second image transmission member 211(b), which may provide the display light of the background image SI of the second image display device 110(b) toward the second optical panel 205(b).

The first image transmission member 211(a) may further include a first optical material of at least one of a first optical waveguide (e.g., a prism), a first diffusion lens 112(a), and a first focusing lens 114(a). Accordingly, the display light of the main image MI displayed through the first display module 210(a) may be provided to the first optical panel 205(a) and to a user's eyes through the first optical waveguide, the first diffusion lens 112(a), and the first focusing lens 114(a).

The second image transmission member 211(b) may further include a second optical material of at least one of a second optical waveguide (e.g., a prism), a second diffusion lens 112(b), and a second focusing lens 114(b). Accordingly, the display light of the background image SI displayed through the second display module 210(b) may be provided to the second optical panel 205(b) and to the user's eyes through the second optical waveguide, the second diffusion lens 112(b), and the second focusing lens 114(b).

Each of the first and second image display devices 110(a) and 110(b) included in the first display module 210(a) may include a micro-LED display device, a nano-LED display device, an OLED, an inorganic EL display device, a QED, a CRT display device, an LCD, or the like. A case where each of the image display devices 110 includes a micro-LED display device will be described below as an example. However, embodiments are not limited to the micro-LED display device, and other display devices listed above or known in the art are also applicable within the technical spirit of the present disclosure.

Figure 9:
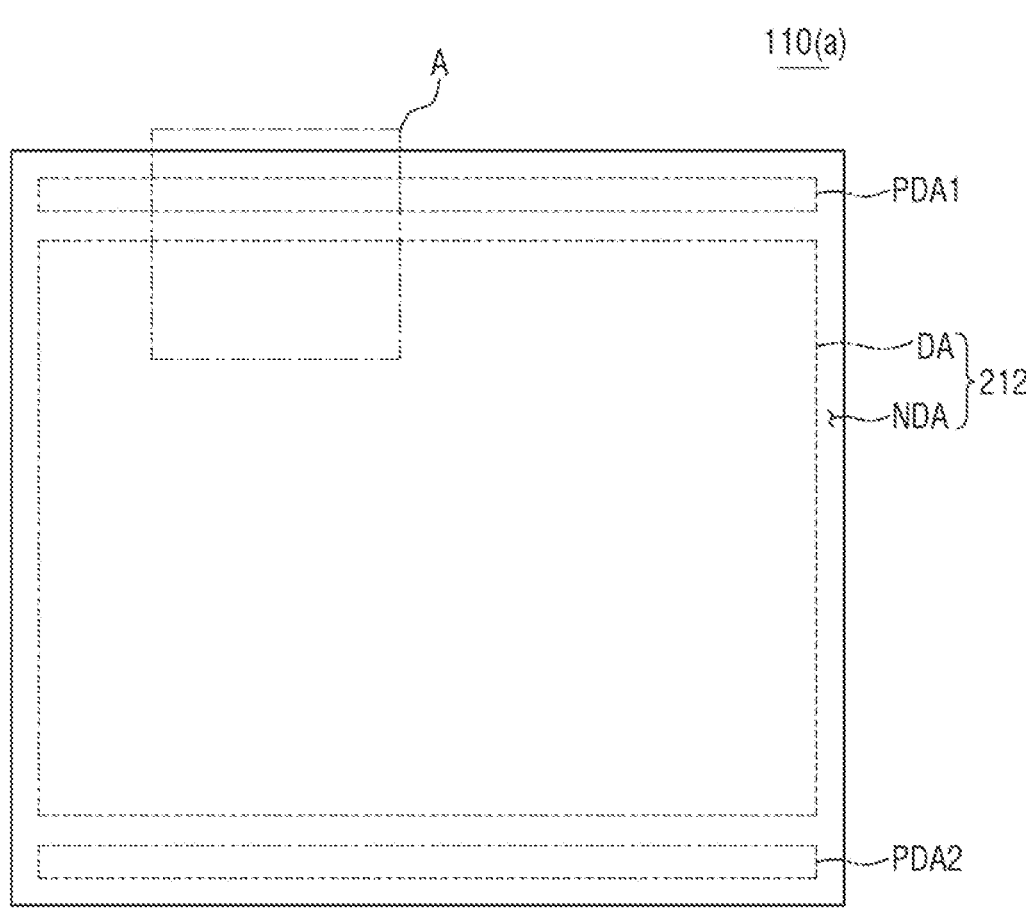
FIG. 9 is a detailed layout view of a first image display device illustrated in FIG. 8.
Figure 9:
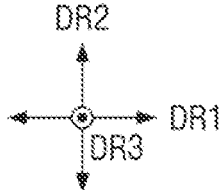
Figure 10:
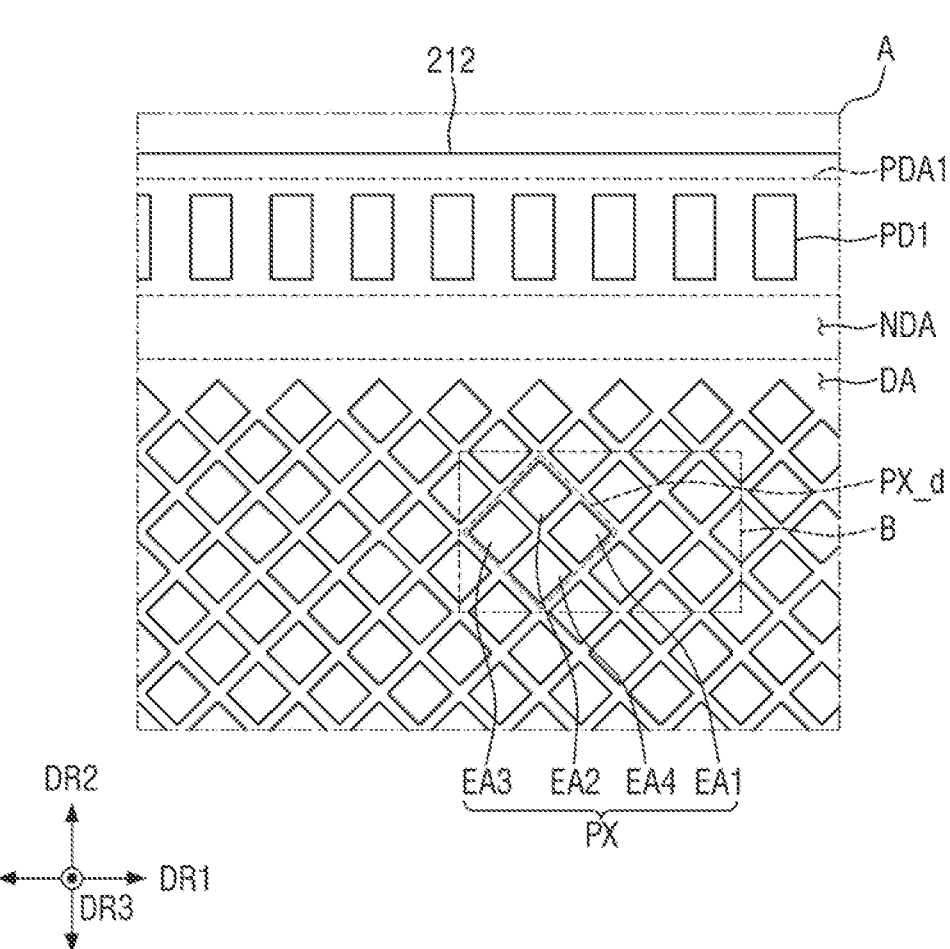
FIG. 10 is a detailed layout view of area A of FIG. 9.
Figure 11:
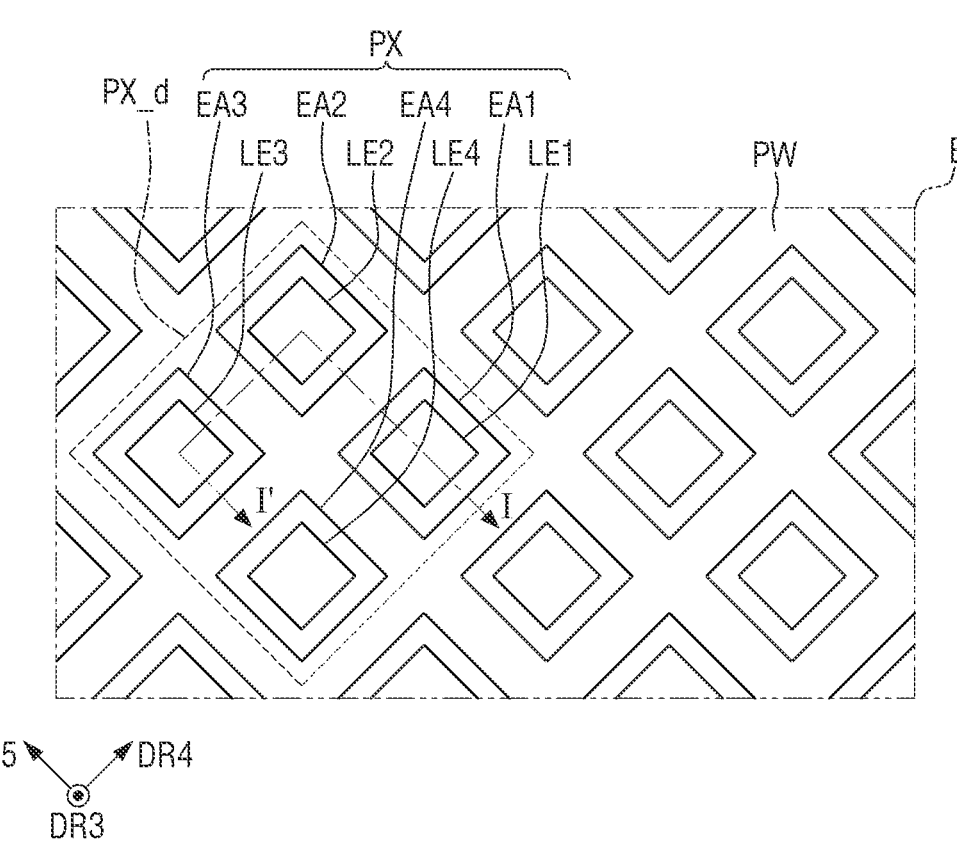
FIG. 11 is a detailed layout view illustrating pixels in area B of FIG. 10.

FIG. 9 is a detailed layout view of the first image display device 110(a) illustrated in FIG. 8. FIG. 10 is a detailed layout view of area A of FIG. 9. FIG. 11 is a detailed layout view illustrating pixels PX in area B of FIG. 10.

The first image display device 110(a) in the embodiments corresponding to FIGS. 9 through 11 has an LED on silicon (LEDoS) structure in which LED elements are located on a semiconductor circuit board formed using a semiconductor process. However, it should be noted that embodiments of the present specification are not limited thereto. In addition, although a case where the first image display device 110(a) according to some embodiments of the present specification is an ultra-small LED display module (a micro or nano LED display module), including ultra-small LEDs (micro or nano LEDs) as light-emitting elements, is mainly described, embodiments of the present specification are not limited to this case.

Figure 12:
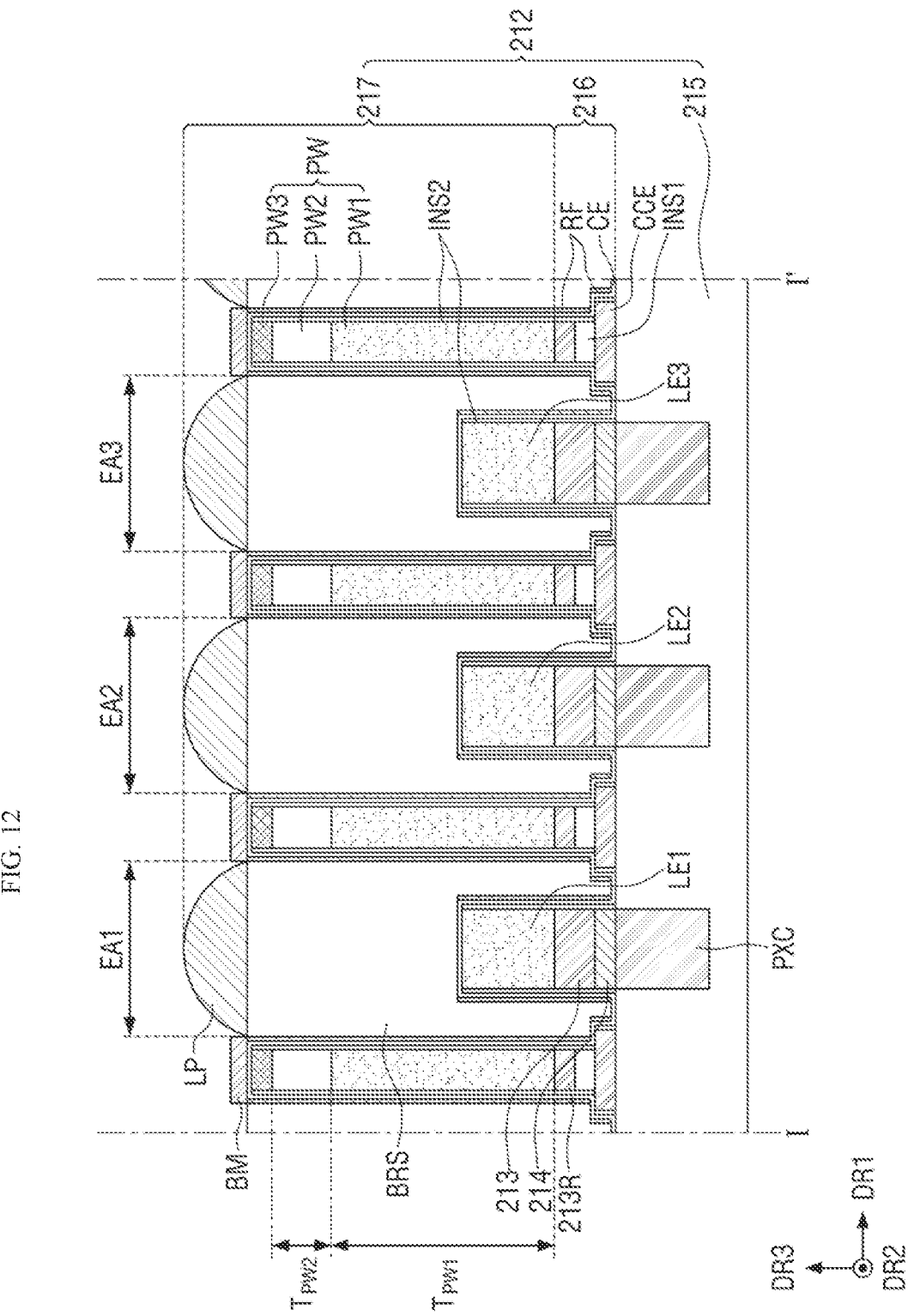
FIG. 12 is a cross-sectional view of an example of an image display device taken along the line I-I' of FIG. 11.

In FIGS. 9 through 11, a first direction DR1 indicates a horizontal direction of the first image display device 110(a), a second direction DR2 indicates a vertical direction of the first image display device 110(a), and a third direction DR3 indicates a thickness direction of a display panel 212 or a thickness direction of a semiconductor circuit board 215 (e.g., see FIG. 12). In addition, a fourth direction DR4 indicates a diagonal direction of the display panel 212, and a fifth direction DR5 indicates a diagonal direction intersecting the fourth direction DR4. In this case, "left," "right,"

"upper," and "lower" indicate directions when the display panel 212 is seen in plan view. For example, a "right side" indicates one side in the first direction DR1, a "left side" indicates the other side in the first direction DR1, an "upper side" indicates one side in the second direction DR2, and a "lower side" indicates the other side in the second direction DR2. In addition, "top" indicates one side in the third direction DR3, and "bottom" indicates the other side in the third direction DR3.

Referring to FIGS. 9 through 11, the first image display device 110(a) includes the display panel 212 including a display area DA and a non-display area NDA.

The display panel 212 of the first image display device 110(a) may have a quadrangular planar shape having long sides in the first direction DR1 and short sides in the second direction DR2. However, the planar shape of the display panel 212 is not limited thereto, and the display panel 212 may also have a polygonal, circular, oval, or irregular planar shape other than the quadrangular shape.

The display area DA may be an area where an image is displayed, and the non-display area NDA may be an area where no image is displayed. The planar shape of the display area DA may follow the planar shape of the display panel 212. In FIG. 9, the planar shape of the display area DA is a quadrangular shape. The display area DA may be located in a central area of the display panel 212. The non-display area NDA may be located around the display area DA. The non-display area NDA may surround the display area DA.

A first pad part PDA1 may be located in the non-display area NDA. The first pad part PDA1 may be located on an upper side of the display panel 212. The first pad part PDA1 may include first pads PD1 connected to an external circuit board. A second pad part PDA2 may be located in the non-display area NDA. The second pad part PDA2 may be located on a lower side of the semiconductor circuit board. The second pad part PDA2 may include second pads to be connected to an external circuit board. The second pad part PDA2 can be omitted in other embodiments.

The display area DA of the display panel 212 may include a plurality of pixels PX. Each of the pixels PX may be defined as a minimum light-emitting unit that can display white light in a defined pixel area PX_d.

Each of the pixels PX respectively located in the pixel areas PX_d as minimum units that can display white light may include a plurality of light-emitting areas EA1 through EA4. In some embodiments of the present specification, each of the pixels PX includes four light-emitting areas EA1 through EA4 located in a PENTILE™ matrix structure (e.g., a PENTILE™ matrix structure, a PENTILE™ structure, an RGBG matrix structure, or an RGBG structure, PENTILE™ being a registered trademark of Samsung Display Co., Ltd., Republic of Korea), but the present disclosure is not limited thereto. For example, each of the pixels PX may include only three light-emitting areas EA1 through EA3 in other embodiments.

The light-emitting areas EA1 through EA4 in each pixel area PX_d may be separated by a partition wall PW. The partition wall PW may surround each of first through fourth light-emitting elements LE1 through LE4 located in the light-emitting areas EA1 through EA4. The partition wall PW may be spaced apart from each of the first through fourth light-emitting elements LE1 through LE4. The partition wall PW may have a mesh shape, a net shape, or a lattice shape in plan view.

In FIGS. 10 and 11, the light-emitting areas EA1 through EA4 defined by the partition wall PW are shaped like diamonds constituting a PENTILE™ matrix structure in plan view. However, embodiments of the present specification are not limited thereto. For example, each of the light-emitting areas EA1 through EA4 defined by the partition wall PW may also have a polygonal shape such as a quadrangle or a triangle, a circular shape, an oval shape, or an irregular shape other than the diamond shape.

Referring to FIG. 10, each first light-emitting area EA1 among the light-emitting areas EA1 through EA4 may include the first light-emitting element LE1 for emitting first light, each second light-emitting area EA2 may include the second light-emitting element LE2 for emitting second light, each third light-emitting area EA3 may include the third light-emitting element LE3 for emitting third light, and each fourth light-emitting area EA4 may include the fourth light-emitting element LE4 for emitting fourth light. The first light may be light in a wavelength band that realizes any one of red, green, and blue colors. In addition, the second light may be light in a wavelength band that realizes any one color different from the first light among the red, green and blue colors. On the other hand, the third light may be light in a wavelength band that realizes any one color different from the first light and the second light among the red, green and blue colors. In addition, the fourth light may be light in the same wavelength band as any one of the first light, the second light, and the third light.

Although a case has been described as an example where each of the first through fourth light-emitting elements LE1 through LE4 respectively included in the first through fourth light-emitting areas EA1 through EA4 located in a PEN-TILE™ matrix structure has a diamond shape in plan view, embodiments of the present specification are not limited thereto. For example, each of the first through fourth light-emitting elements LE1 through LE4 may instead have a polygonal shape, such as a triangle or a quadrangle, a circular shape, an oval shape, or an irregular shape other than the diamond shape.

Each of the first light-emitting areas EA1 indicates an area for emitting the first light. Each of the first light-emitting elements EA1 outputs the first light emitted from the first light-emitting element LE1. As described above, the first light may be light in a wavelength band that realizes any one of the red, green, and blue colors. For example, the first light may be light in a red wavelength band. The red wavelength band may be about 600 nm to about 700 nm, but embodiments of the present specification are not limited thereto.

Each of the second light-emitting areas EA2 indicates an area for emitting the second light. Each of the second light-emitting areas EA2 outputs the second light emitted from the second light-emitting element LE2. The second light may be light in a wavelength band that realizes any one color different from the first light among the red, green and blue colors. For example, the second light may be light in a blue wavelength band. The blue wavelength band may be about 370 nm to about 460 nm, but embodiments of the present specification are not limited thereto.

Each of the third light-emitting areas EA3 indicates an area for emitting the third light. Each of the third light-emitting areas EA3 outputs the third light emitted from the third light-emitting element LE3. The third light may be light in a wavelength band that realizes any one color different from the first light and the second light among the red, green and blue colors. For example, the third light may be light in a green wavelength band. The green wavelength band may be about 480 nm to about 560 nm, but embodiments of the present specification are not limited thereto.

Each of the fourth light-emitting areas EA4 indicates an area for emitting the fourth light. Each of the fourth light-emitting areas EA4 outputs the fourth light emitted from the fourth light-emitting element LE4. Here, the fourth light may be light in a wavelength band that realizes the same color as any one of the first light, the second light, and the third light. For example, the fourth light may be light in the same blue wavelength band as the second light, or may be light in the same green wavelength band as the third light. However, embodiments of the present specification are not limited thereto.

The second light-emitting area EA2 of each pixel PX may alternate with the fourth light-emitting areas EA4 of other adjacent pixels PX along the first direction DR1, which is the horizontal (or row) direction. In addition, the first light-emitting area EA1 and the third light-emitting area EA3 of each pixel PX may be alternately located along the first direction DR1. On the other hand, the fourth light-emitting area EA4 of each pixel PX may alternate with the second light-emitting areas EA2 of other adjacent pixels PX along the first direction DR1.

The first light-emitting areas EA1 and the fourth light-emitting areas EA4 may be alternately located along the fourth direction DR4, which is a first diagonal direction, and the second light-emitting areas EA2 and the third light-emitting areas EA3 may also be alternately located along the fourth direction DR4. Accordingly, the second light-emitting areas EA2 and the first light-emitting areas EA1 may be alternately located along the fifth direction DR5, which is a second diagonal direction intersecting the first diagonal direction, and the third light-emitting areas EA3 and the fourth light-emitting areas EA4 may also be alternately located along the fifth direction DR5. Accordingly, the pixels PX as a whole may also be located and arranged in a PENTILE™ matrix structure.

The first through fourth light-emitting areas EA1 through EA4 of each pixel PX may have the same size or planar area, or may have different respective sizes or planar areas. Likewise, the first through fourth light-emitting elements LE1 through LE4 respectively formed in the first through fourth light-emitting areas EA1 through EA4 may also have the same size or planar area, or different respective sizes or planar areas.

For example, the area of each first light-emitting area EA1, the area of each second light-emitting area EA2, the area of each third light-emitting area EA3, and the area of each fourth light-emitting area EA4 may be substantially the same, but embodiments of the present specification are not limited thereto. For example, the areas of the first and second light-emitting areas EA1 and EA2 may be different, the areas of the second and third light-emitting areas EA2 and EA3 may be different, and the areas of the third and fourth light-emitting areas EA3 and EA4 may be different. Here, at least two of the first through fourth light-emitting areas EA1 through EA4 may have the same area.

A distance between the first and second light-emitting areas EA1 and EA2 neighboring each other in the horizontal or diagonal direction, a distance between the second and third light-emitting areas EA2 and EA3, a distance between the third and fourth light-emitting areas EA3 and EA4, and a distance between the first and fourth light-emitting areas EA1 and EA4 may be the same, but may also be different according to a corresponding change in area. Embodiments of the present specification are not limited thereto.

In addition, embodiments of the present specification are not limited to the example in which the first light-emitting elements EA1 emit the first light, the second light-emitting areas EA2 emit the second light, the third light-emitting areas EA3 emit the third light, and the fourth light-emitting areas EA3 emit the third light, and the fourth light-emitting areas EA4 emit the same light as any one of the first light, the second light, and the third light. At least one of the first through fourth light-emitting areas EA1 through EA4 may also emit fifth light. Here, the fifth light may be light in a yellow wavelength band. That is, a main peak wavelength of the fifth light may be located in the range of about 550 nm to about 600 nm, but embodiments of the present specification are not limited thereto.

Figure 13:
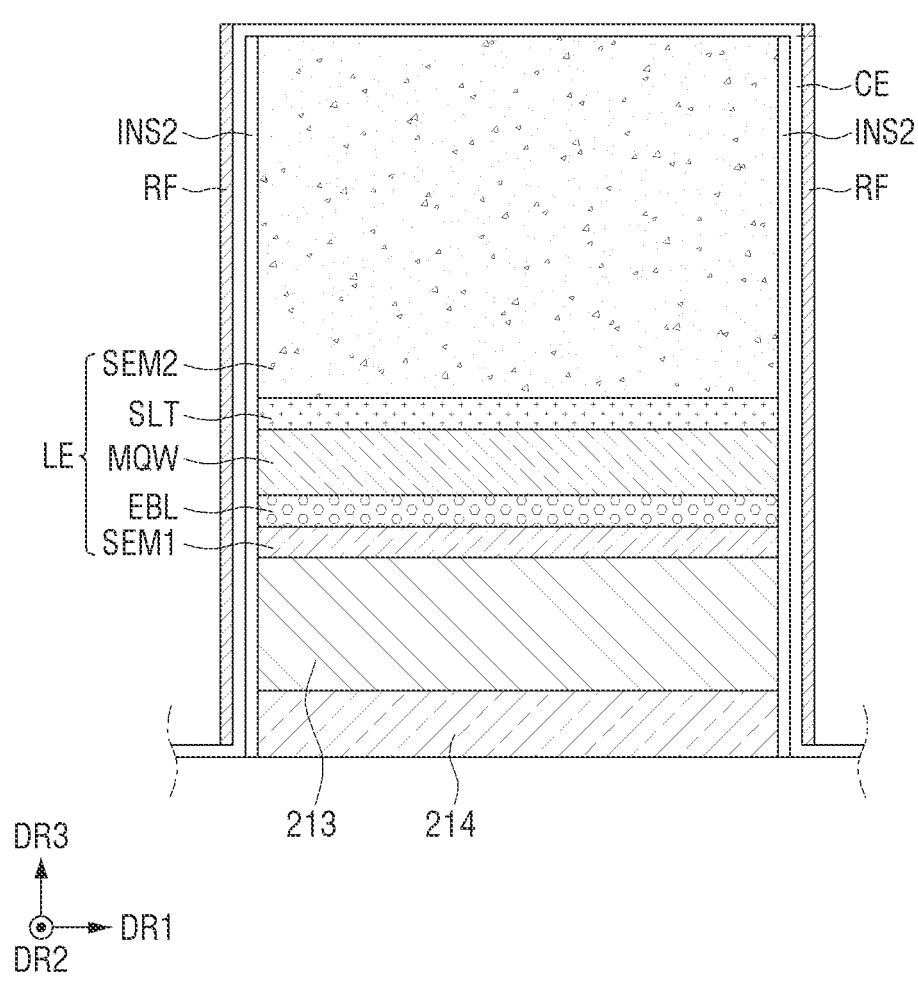
FIG. 13 is a detailed enlarged cross-sectional view of an example of a light-emitting element of FIG. 12.

FIG. 12 is a cross-sectional view of an example of an image display device taken along the line I-I' of FIG. 11. FIG. 13 is a detailed enlarged cross-sectional view of an example of a light-emitting element of FIG. 12.

Referring to FIGS. 12 and 13, the display panel 212 may include the semiconductor circuit board 215, a conductive connection layer 216, and a light-emitting element layer 217.

The semiconductor circuit board 215 may include a plurality of pixel circuit units PXC and pixel electrodes 214. The conductive connection layer 216 may include connection electrodes 213, the first pads PD1, a common connection electrode CCE, a first insulating layer INS1, and a conductive pattern 213R.

The semiconductor circuit board 215 may be a silicon wafer substrate formed using a semiconductor process. The pixel circuit units PXC of the semiconductor circuit board 215 may be formed using a semiconductor process.

The pixel circuit units PXC may be located in the display area DA (see FIG. 9). Each of the pixel circuit units PXC may be connected to a corresponding pixel electrode 214. That is, the pixel circuit units PXC and the pixel electrodes 214 may be connected in a one-to-one correspondence to each other. Each of the pixel circuit units PXC may overlap one of the light-emitting elements LE1 through LE4 respectively corresponding to the pixel circuit units PXC in the third direction DR3. Each of the pixel circuit units PXC may have various other modified circuit structures, such as a 3T1C structure, a 2T1C structure, a 7T1C structure, and a 6T1C structure.

Each of the pixel electrodes 214 may be located on a corresponding pixel circuit unit PXC. Each of the pixel electrodes 214 may be an exposed electrode exposed from the pixel circuit unit PXC. That is, each of the pixel electrodes 214 may protrude from an upper surface of the pixel circuit unit PXC. Each of the pixel electrodes 214 may be integrally formed with the pixel circuit unit PXC. Each of the pixel electrodes 214 may receive a pixel voltage or an anode voltage from the pixel circuit unit PXC. The pixel electrodes 214 may be made of aluminum (Al).

Each of the connection electrodes 213 may be located on a corresponding pixel electrode 214. The connection electrodes 213 may include a metal material for bonding the pixel electrodes 214 to the light-emitting elements LE1 through LE4, respectively.

The common connection electrode CCE may be spaced apart from the pixel electrodes 214 and the connection electrodes 213 (e.g., in a plan view). Respective common connection electrodes CCE may surround the pixel electrodes 214 and the connection electrodes 213. The common connection electrode CCE may be connected to any one of the first pads PD1 in the first pad part PDA1 of the non-display area NDA to receive a common voltage. The common connection electrode CCE may include the same material as the connection electrodes 213.

The first insulating layer INS1 may be located on the common connection electrode CCE. A width of the first insulating layer INS1 in the first direction DR1 or the second direction DR2 may be less than a width of the common connection electrode CCE. Therefore, a part of an upper surface of the common connection electrode CCE may be exposed without being covered by the first insulating layer INS1. The part of the upper surface of the common connection electrode CCE exposed without being covered by the first insulating layer INS1 may contact a common electrode CE. Therefore, the common electrode CE may be connected to the common connection electrode CCE.

The conductive pattern 213R may be located on the first insulating layer INS1. The conductive pattern 213R may be located between the first insulating layer INS1 and the partition wall PW. A width of the conductive pattern 213R in the first direction DR1 and/or the second direction DR2 may be substantially the same as the width of the first insulating layer INS1 or the width of the partition wall PW. The conductive pattern 213R corresponds to a residue formed in the same process as the connection electrodes 213 and the common connection electrode CCE.

The light-emitting element layer 217 may include the light-emitting elements LE1 through LE4, the partition wall PW, a second insulating layer INS2, the common electrode CE, a reflective layer RF, a light blocking member BM, and optical patterns LP.

The light-emitting element layer 217 may include the first through fourth light-emitting areas EA1 through EA4 separated by the partition wall PW. In each of the first through fourth light-emitting areas EA1 through EA4, at least one of a light-emitting element LE and an optical pattern LP may be located.

The light-emitting elements LE1 through LE3 of FIG. 12 may be located on the connection electrodes 213 in the light-emitting areas EA1 through EA3, respectively. A length (or height) of each of the light-emitting elements LE1 through LE3 in the third direction DR3 may be greater than a length thereof in the horizontal direction. The length in the horizontal direction indicates a length in the first direction DR1 or a length in the second direction DR2. For example, the length of the first light-emitting element LE1 in the third direction DR3 may be about 1 μm to about 5 μm.

Referring to FIG. 13, each of the light-emitting elements LE1 through LE4 includes a first semiconductor layer SEM1, an electron blocking layer EBL, an active layer MQW, a superlattice layer SLT, and a second semiconductor layer SEM2. The first semiconductor layer SEM1, the electron blocking layer EBL, the active layer MQW, the superlattice layer SLT, and the second semiconductor layer SEM2 may be sequentially stacked in the third direction DR3.

The first semiconductor layer SEM1 may be located on a connection electrode 213. The first semiconductor layer SEM1 may be a semiconductor layer doped with a first conductivity type dopant such as Mg, Zn, Ca, Sr, or Ba. For example, the first semiconductor layers SEM1 may be p-GaN doped with p-type Mg. A thickness of the first semiconductor layer SEM1 may be about 30 nm to about 200 nm.

The electron blocking layer EBL may be located on the first semiconductor layer SEM1. The electron blocking layer EBL may be a layer for suppressing or preventing too many electrons from flowing into the active layer MQW. For example, the electron blocking layer EBL may be p-AlGaN doped with p-type Mg. A thickness of the electron blocking layer EBL may be about 10 nm to about 50 nm. The electron blocking layer EBL can be omitted in other embodiments.

The active layer MQW may be divided into first through third active layers. Each of the first through third active layers may include a material having a single or multiple quantum well structure. When each of the first through third active layers includes a material having a multiple quantum well structure, it may have a structure in which a plurality of well layers and a plurality of barrier layers are alternately stacked. Here, the first active layer may include InGaN or GaAs, and the second active layer and the third active layer may include InGaN, but embodiments of the present specification are not limited thereto. Here, the first active layer may emit light through combination of electron-hole pairs according to an electrical signal. The first active layer may emit the first light having a main peak wavelength in the range of about 600 nm to about 750 nm, that is, may emit light in a red wavelength band. The second active layer may emit light through combination of electron-hole pairs according to an electrical signal. The second active layer may emit the third light having a main peak wavelength in the range of about 480 nm to about 560 nm, that is, may emit light in a green wavelength band. The third active layer may emit light through combination of electron-hole pairs according to an electrical signal. The third active layer may emit the second light having a main peak wavelength in the range of about 370 nm to about 460 nm, that is, may emit light in a blue wavelength band.

The color of light emitted from each of the first through third active layers may vary according to indium content. For example, as the indium content decreases, the wavelength band of light emitted from each of the first through third active layers may shift to the red wavelength band. As the indium content increases, the wavelength band of the emitted light may shift to the blue wavelength band. The content of indium (In) in the first active layer may be higher than the content of indium (In) in the second active layer, and the content of indium (In) in the second active layer may be higher than the content of indium (In) in the third active layer. For example, the indium (In) content of the third active layer may be about 15%, the indium (In) content of the second active layer may be about 25%, and the indium (In) content of the first active layer may be about 35% or more.

Because the color of light emitted from each of the first through third active layers can vary according to the indium content, the light-emitting element layer 217 of each of the light-emitting elements LE1 through LE3 may emit the same light or different light, such as the first light, the second light, or the third light, according to the indium content. For example, when the content of indium (In) in the first through third active layers of the first light-emitting element LE1 is about 15% or less, the first light in the red wavelength band having a main peak wavelength in the range of about 600 nm to about 750 nm may be emitted. In addition, when the content of indium (In) in the first through third active layers of the second light-emitting element LE2 is about 25%, the second light in the green wavelength band having a main peak wavelength in the range of about 480 nm to about 560 nm may be emitted. In addition, when the content of indium (In) in the first through third active layers of the third light-emitting element LE3 is about 35% or more, the third light in the blue wavelength band having a main peak wavelength in the range of about 370 nm to about 460 nm may be emitted. The fourth light-emitting element LE4 may also be made to emit the first, second or third light or the fourth light by adjusting and setting the content of indium (In) in the first through third active layers of the fourth light-emitting element LE4.

The superlattice layer SLT may be located on the active layer MQW. The superlattice layer SLT may be a layer for relieving stress between the second semiconductor layer SEM2 and the active layer MQW. For example, the superlattice layer SLT may be made of InGaN or GaN. A thickness of the superlattice layer SLT may be about 50 nm to about 200 nm. The superlattice layer SLT can be omitted.

The second semiconductor layer SEM2 may be located on the superlattice layer SLT. The second semiconductor layer SEM2 may be doped with a second conductivity type dopant such as Si, Ge, or Sn. For example, the second semiconductor layer SEM2 may be n-GaN doped with n-type Si. A thickness of the second semiconductor layer SEM2 may be about 2 $\mu$m to about 4 $\mu$m.

The partition wall PW may be spaced apart from each of the light-emitting elements LE1 through LE4 respectively located in the first through fourth light-emitting areas EA1 through EA4. The partition wall PW may surround (e.g., in a plan view) the light-emitting elements LE1 through LE4 respectively located in the first through fourth light-emitting areas EA1 through EA4.

The partition wall PW may be located on the common connection electrode CCE. The width of the partition wall PW in the first direction DR1 and the second direction DR2 may be less than the width of the common connection electrode CCE. The partition wall PW may be spaced apart from the light-emitting elements LE.

The partition wall PW may include a first partition wall PW1, a second partition wall PW2, and a third partition wall PW3. The first partition wall PW1 may be located on the first insulating layer INS1. Because the first partition wall PW1 is formed in the same process as the light-emitting elements LE, at least a part of the first partition wall PW1 may include the same material as the light-emitting elements LE. In addition, a thickness $T_{PW1}$ of the first partition wall PW1 is greater than a thickness $T_{PW2}$ of the second partition wall PW2.

The second insulating layer INS2 may be located on side surfaces of the common connection electrode CCE, side surfaces of the partition wall PW, side surfaces of each of the pixel electrodes 214, side surfaces of each of the connection electrodes 213, and side surfaces of each of the light-emitting elements LE1 through LE4. The second insulating layer INS2 may be made of an inorganic layer such as a silicon oxide layer (SiO$_2$). A thickness of the second insulating layer INS2 may be about 0.1 $\mu$m.

The common electrode CE may be located on upper and side surfaces of each of the light-emitting elements LE1 through LE4, and on upper and side surfaces of the partition wall PW (e.g., with the second insulating layer INS2 partially therebetween). That is, the common electrode CE may cover the upper and side surfaces of each of the light-emitting elements LE1 through LE4, and may cover the upper and side surfaces of the partition wall PW.

The common electrode CE may contact the second insulating layer INS2 located on the side surfaces of the common connection electrode CCE, the side surfaces of the partition wall PW, the side surfaces of each of the pixel electrodes 214, the side surfaces of each of the connection electrodes 213, and the side surfaces of each of the light-emitting elements LE1 through LE4. In addition, the common electrode CE may contact the upper surface of the common connection electrode CCE, the upper surface of each of the light-emitting elements LE1 through LE4, and the upper surface of the partition wall PW.

The common electrode CE may contact the upper surface of the common connection electrode CCE and the upper surfaces of the light-emitting elements LE1 through LE4 exposed without being covered by the second insulating layer INS2. Therefore, the common voltage supplied to the common connection electrode CCE may be applied to the light-emitting elements LE1 through LE4. That is, an end of each of the light-emitting elements LE1 through LE4 may receive the pixel voltage or the anode voltage of a pixel electrode 214 through a connection electrode 213, and the other end may receive the common voltage through the common electrode CE. Each of the light-emitting elements LE may emit light of a luminance (e.g., a predetermined luminance) according to a voltage difference between the pixel voltage and the common voltage.

The reflective layer RF may be located on the side surfaces of the common connection electrode CCE, the side surfaces of the partition wall PW, the side surfaces of each of the pixel electrodes 214, the side surfaces of each of connection electrodes 213, and the side surfaces of each of the light-emitting elements LE1 through LE4 (e.g., with the common electrode CE and the second insulating layer INS2 therebetween). The reflective layer RF reflects light travelling in upper, lower, left, and right lateral directions, instead of in an upward direction, among the light emitted from the light-emitting elements LE1 through LE4. The reflective layer RF may include a metal material having high reflectivity, such as aluminum (Al). A thickness of the reflective layer RF may be about 0.1 μm.

A base resin BRS may be located on a protective layer PTF in each of the light-emitting elements LE1 through LE4. The base resin BRS may include a light-transmitting organic material. The base resin BRS may further include a scatterer for scattering light of the light-emitting elements LE1 through LE4 in random directions. In this case, the scatterer may include metal oxide particles or organic particles.

The light blocking member BM may be located on the partition wall PW. The light blocking member BM may include a light blocking material. The light blocking member BM may be located between respective adjacent ones of the light-emitting areas EA1 through EA4 to reduce or prevent color mixing between light of different wavelength bands emitted from the respective light-emitting elements LE1 through LE4 of the light-emitting areas EA1 through EA4. In addition, the light blocking member BM may reduce reflection of external light by absorbing at least a part of the external light incident on the light-emitting element layer 217 from the outside. The light blocking member BM may be located on the partition wall PW, but may further extend to each of the light-emitting areas EA1 through EA4. That is, a width of the light blocking member BM may be greater than the width of the partition wall PW.

The optical patterns LP may be selectively located on the light-emitting areas EA1 through EA4, respectively. The optical patterns LP may be directly located on the base resins BRS of the light-emitting areas EA1 through EA4, respectively. The optical patterns LP may protrude in the upward direction (e.g., in a direction from the light-emitting elements LE1 through LE4 toward the optical patterns LP). For example, a cross-sectional shape of each of the optical patterns LP may include a lens shape convex upward. Each of the optical patterns LP may be located on the base resin BRS thereunder and the light blocking member BM. A width of each of the optical patterns LP may be equal to, greater than, or less than the width of each of the light-emitting areas EA1 through EA4. Each of the optical patterns LP may concentrate the first, second, third, or fourth light passing through the base resin BRS in a respective one of the light-emitting areas EA1 through EA4.

Figures 14, 15:
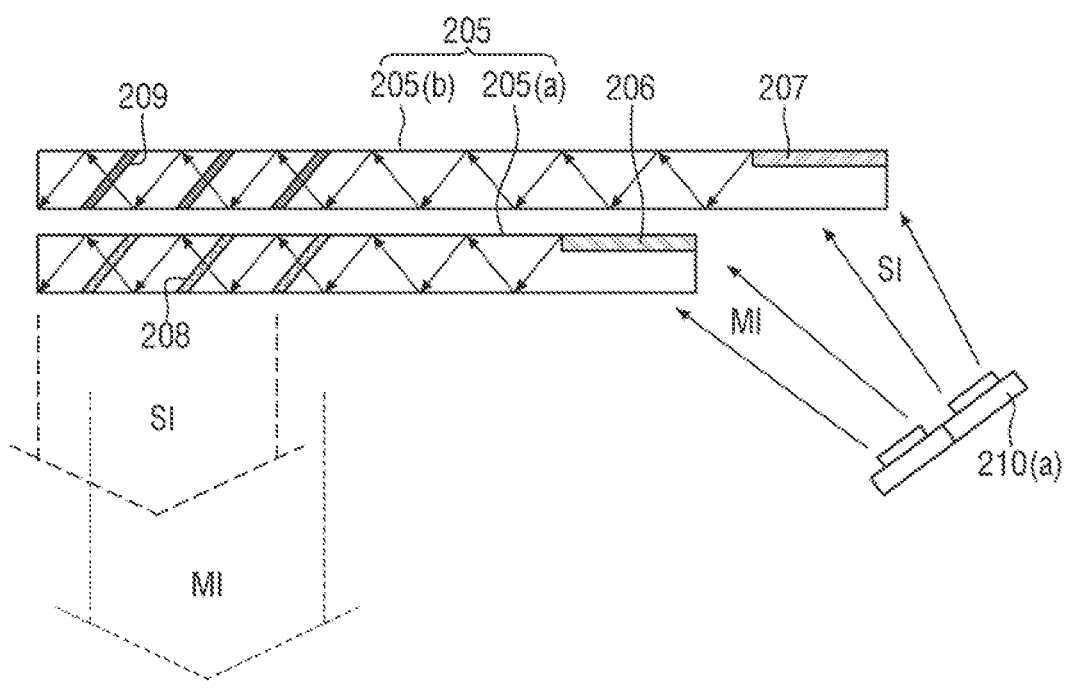
FIG. 14 illustrates the configuration of an AR-content-providing device according to some embodiments of the present disclosure.
FIG. 15 illustrates the configuration of an AR-content-providing device according to some embodiments of the present disclosure.

FIG. 14 illustrates the configuration of an AR-content-providing device 200 according to some embodiments of the present disclosure.

Referring to FIG. 14, at least one optical member 205 forms a display path (or a light path) of each of a background image SI and a main image MI so that the background image SI and the main image MI displayed separately on a first display module 210(a) are superimposed on each other. Accordingly, the background image SI and the main image MI may be perceived by a user's eyes as being superimposed on each other.

A first optical panel 205(a) of the optical member 205 further includes a plurality of first multi-stage reflective members 208, which form a light refraction path together with at least one first grating coupler 206, so that the display light path of the main image MI is refracted in the direction of a user's eyes.

The first multi-stage reflective members 208 are embedded in the first optical panel 205(a) located at a position directly corresponding to the position of the user's eyes to change the display light path of the main image MI received along an internal light path of the first optical panel 205(a) toward the user's eyes.

A second optical panel 205(b) of the optical member 205 further includes a plurality of second multi-stage reflective members 209, which form a light refraction path together with at least one second grating coupler 207, so that the display light path of the background image SI is refracted in the direction of the user's eyes.

The second multi-stage reflective members 209 are embedded in the second optical panel 205(b) located at a position directly corresponding to the position of the user's eyes to change the display light path of the background image SI received along an internal light path of the second optical panel 205(b) toward the user's eyes. A prism or a polarizing or reflecting material may be applied as the first and second multi-stage reflective members 208 and 209.

FIG. 15 illustrates the configuration of an AR-content-providing device 200 according to some embodiments of the present disclosure.

Referring to FIG. 15, first and second optical panels 205(a) and 205(b) may be formed in the same flat plate shape and may overlap each other so that a plane direction faces and corresponds to a user's eye direction. The second optical panel 205(b) may overlap a rear surface of the first optical panel 205(a).

A thickness Da of the first optical panel 205(a), and a thickness Db of the second optical panel 205(b), may be the same, or may be different from each other. However, the thickness Da of the first optical panel 205(a) that forms a display light path of a main image MI may be less than the thickness Db of the second optical panel 205(b) so that a display light path of the first optical panel 205(a) is shorter than a display light path of the second optical panel 205(b). When the display light path of the first optical panel 205(a) is shorter than that of the second optical panel 205(b), the display efficiency of the main image MI displayed through the first optical panel 205(a) may be higher than that of a background image SI displayed through the second optical panel 205(b). That is, the main image MI may be displayed with higher optical characteristics, such as brightness, sharpness, and luminance, than the background image SI.

The area or width La of the first optical panel 205(a), and the area or width Lb of the second optical panel 205(b), may be the same, or may be different from each other. However, the area or width La of the first optical panel 205(a) that forms the display light path of the main image MI may be less than the area or width Lb of the second optical panel 205(b), such that the display light path of the first optical panel 205(a) is shorter than the display light path of the second optical panel 205(*b*). When the display light path of the first optical panel 205(*a*) is shorter than that of the second optical panel 205(*b*), the main image MI displayed through the first optical panel 205(*a*) may be displayed with higher optical characteristics such as brightness, sharpness, and luminance than the background image SI displayed through the second optical panel 205(*b*).

An overlapping distance Cc between the first optical panel 205(*a*) and the second optical panel 205(*b*) may be adjusted and set in advance according to any one of the thickness Da of the first optical panel 205(*a*) and the thickness Db of the second optical panel 205(*b*). As the overlapping distance Cc between the first optical panel 205(*a*) and the second optical panel 205(*b*) increases or decreases, the sharpness and focal length of a 3D image may change. Therefore, the overlapping distance Cc between the first and second optical panels 205(*a*) and 205(*b*) may be adjusted and set to be equal to or less than any one of the thicknesses Da and Db of the first and second optical panels 205(*a*) and 205(*b*).

Figure 16:
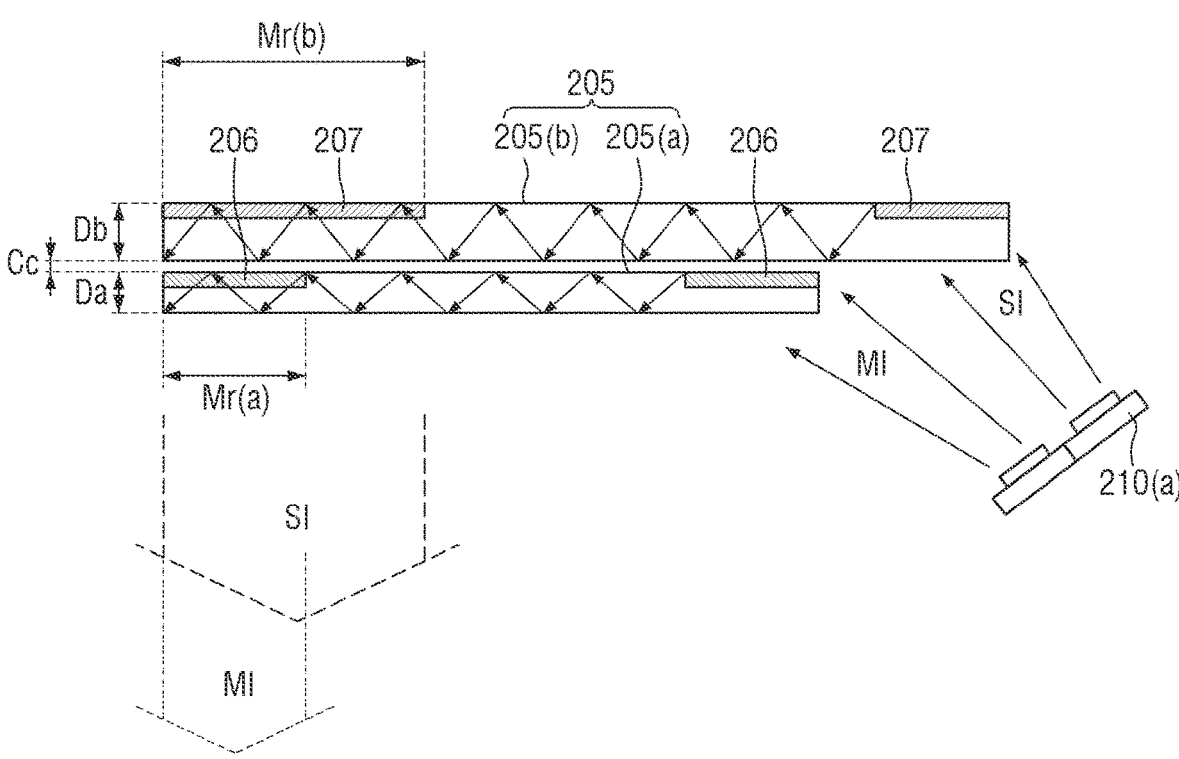
FIG. 16 illustrates the configuration of an AR-content-providing device according to some embodiments of the present disclosure.

FIG. 16 illustrates the configuration of an AR-content-providing device 200 according to some embodiments of the present disclosure.

Referring to FIG. 16, a first optical panel 205(*a*) is formed such that display light of a main image MI incident in any one direction is refracted by a surface of the first optical panel 205(*a*) and by an angle of one or more first grating couplers 206 to reach a user's eyes. Likewise, a second optical panel 205(*b*) is formed such that display light of a background image SI incident in any one direction is refracted by a surface of the second optical panel 205(*b*) and by an angle of one or more second grating couplers 207 to reach the user's eyes.

The area or width Mr(a) of each of the first grating couplers 206 formed inside the first optical panel 205(*a*) may be less than the area or width Mr(b) of each of the second grating couplers 207 formed inside the second optical panel 205(*b*), so that a light refraction width of the first optical panel 205(*a*) is less than a light refraction width of the second optical panel 205(*b*).

When the light refraction width of the first optical panel 205(*a*) is less than that of the second optical panel 205(*b*), a light emission width of the first optical panel 205(*a*) is smaller. Accordingly, the main image MI displayed through the first optical panel 205(*a*) may be displayed with higher optical characteristics than the background image SI displayed through the second optical panel 205(*b*).

Figure 17:
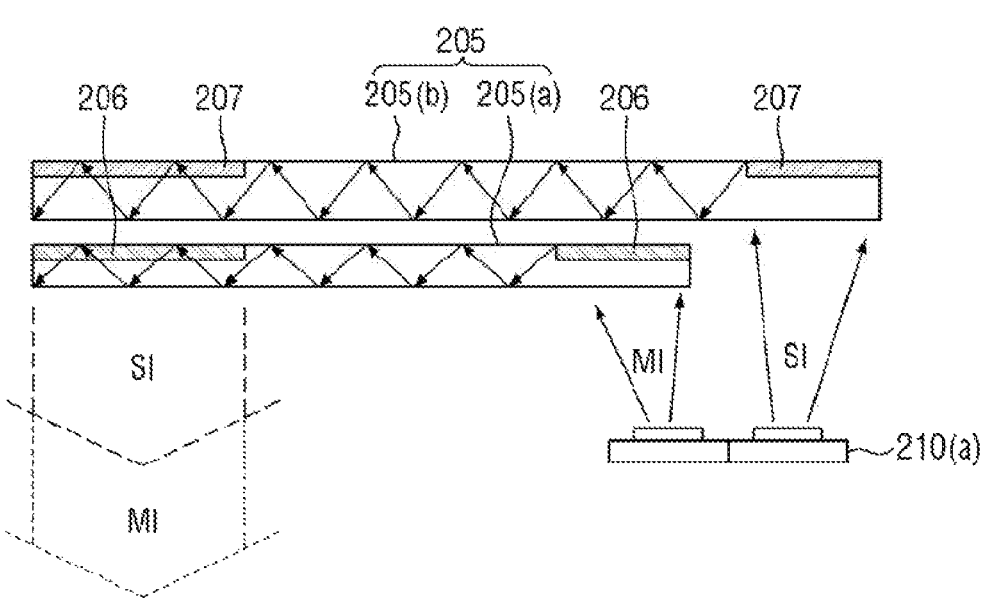
FIG. 17 illustrates the configuration of an AR-content-providing device according to some embodiments of the present disclosure in which the position of a first display module is changed.

FIG. 17 illustrates the configuration of an AR-content-providing device 200 according to some embodiments of the present disclosure in which the position of a first display module 210(*a*) is changed.

Referring to FIG. 17, at least one display module 210(*a*) or 210(*b*) may be located in front of front peripheral areas of first and second optical panels 205(*a*) and 205(*b*) to provide light of a background image SI and light of a main image MI to the front peripheral areas of the first and second optical panels 205(*a*) and 205(*b*), respectively.

When the display module 210(*a*) or 210(*b*) is located on a side of, or diagonally in front of, the first and second optical panels 205(*a*) and 205(*b*), the overall width or area of the AR-content-providing device 200 may be inevitably increased. Therefore, the display module 210(*a*) or 210(*b*) may be located in front of the front peripheral areas of the first and second optical panels 205(*a*) and 205(*b*) to reduce the overall width or area of the AR-content-providing device 200.

Alternatively, the display module 210(*a*) or 210(*b*) may be located on a side of, or diagonally in front of, the first and second optical panels 205(*a*) and 205(*b*) to provide the light of the background image SI and the light of the main image MI to the front peripheral areas of the first and second optical panels 205(*a*) and 205(*b*), respectively. In this case, the overall width or area of the AR-content-providing device 200 may be increased. However, light transmission efficiency can be improved by reducing light incident angles of the background image SI and the main image MI incident on the front peripheral areas of the first and second optical panels 205(*a*) and 205(*b*).

Figure 18:
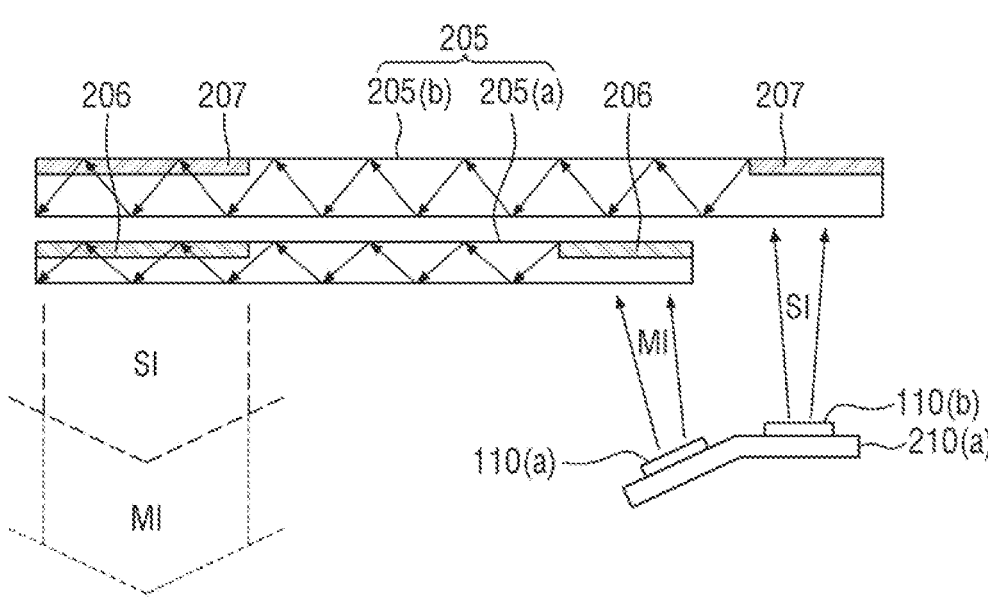
FIG. 18 illustrates the configuration of an AR-content-providing device according to some embodiments of the present disclosure in which the position of a first display module is changed.

FIG. 18 illustrates the configuration of an AR-content-providing device 200 according to some embodiments of the present disclosure in which the position of a first display module 210(*a*) is changed.

Referring to FIG. 18, at least one display module 210(*a*) or 210(*b*), for example, the first display module 210(*a*) may be formed such that display light of a main image MI and display light of a background image SI are emitted at different emission angles. Accordingly, the first display module 210(*a*) may cause the display light of the main image MI to be incident on a first optical panel 205(*a*) in a diagonal lateral direction, and may cause the display light of the background image SI to be straightly incident on a front peripheral area of a second optical panel 205(*b*). In this case, the display module 210(*a*) or 210(*b*) may be located in front of the front peripheral areas of the first and second optical panels 205(*a*) and 205(*b*) to reduce the overall width or area of the AR-content-providing device 200, thereby increasing design freedom.

Figure 19:
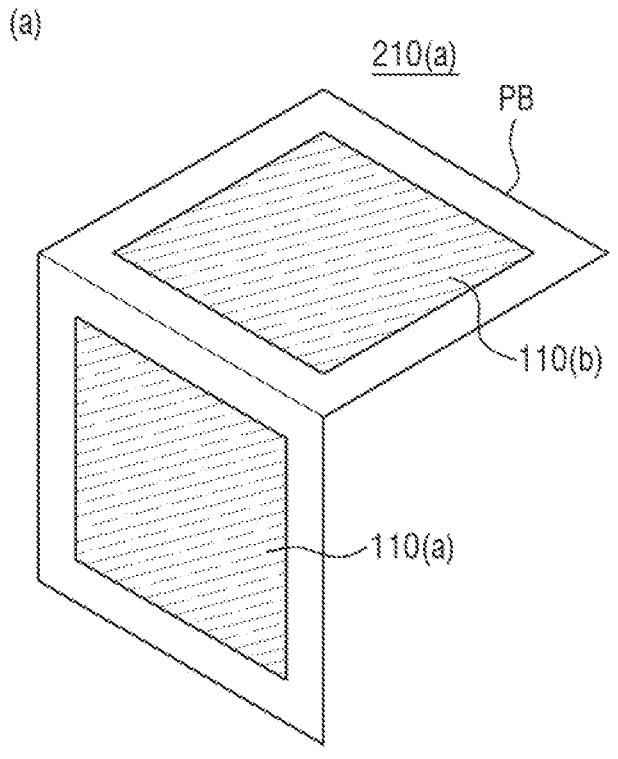
FIG. 19 is a perspective view illustrating a modified structure of the first display module illustrated in FIGS. 16 through 18.
Figure 19:
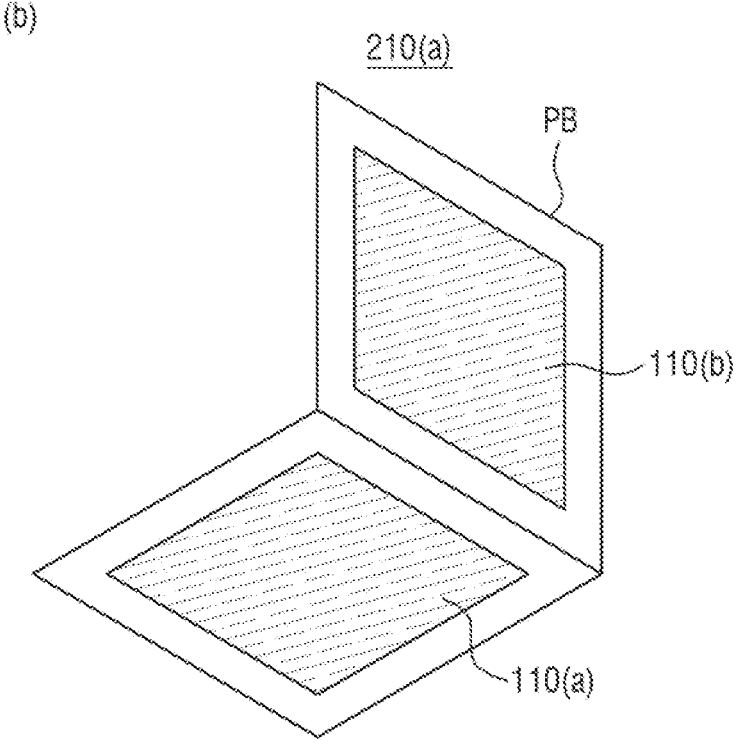

FIG. 19 is a perspective view illustrating a modified structure of the first display module 210(*a*) illustrated in FIGS. 16 through 18.

Referring to FIG. 19, at least one display module 210(*a*) or 210(*b*), for example, a first display module 210(*a*) may be bent at a corresponding angle (e.g., a preset angle) so that display light of a main image MI and display light of a background image SI are emitted at different emission angles. For example, (a) of FIG. 19 and (b) of FIG. 19 show cases of bending at different angles. To this end, a circuit board PB of the first display module 210(*a*) may be bent at a corresponding angle (e.g., a preset angle) so that first and second image display devices 110(*a*) and 110(*b*) located on the circuit board PB emit the display light of the main image MI and the display light of the background image SI at different respective angles.

The first image display device 110(*a*) displaying the main image MI, and the second image display device 110(*b*) displaying the background image SI, may be set to different respective resolutions, display luminances, and/or brightness levels.

For example, the first image display device 110(*a*) may be set to display the main image MI with a resolution of about 6000 ppi and a luminance of about 80000 nit. In addition, the second image display device 110(*b*) may be set to display the background image SI with a resolution of about 1000 ppi and a luminance of about 10000 nit. In this way, by setting the first image display device 110(*a*) and the second image display device 110(*b*) to different resolution levels, display luminance levels, and/or brightness levels, it is possible to further improve the 3D image display effect and efficiency.

Figure 20:
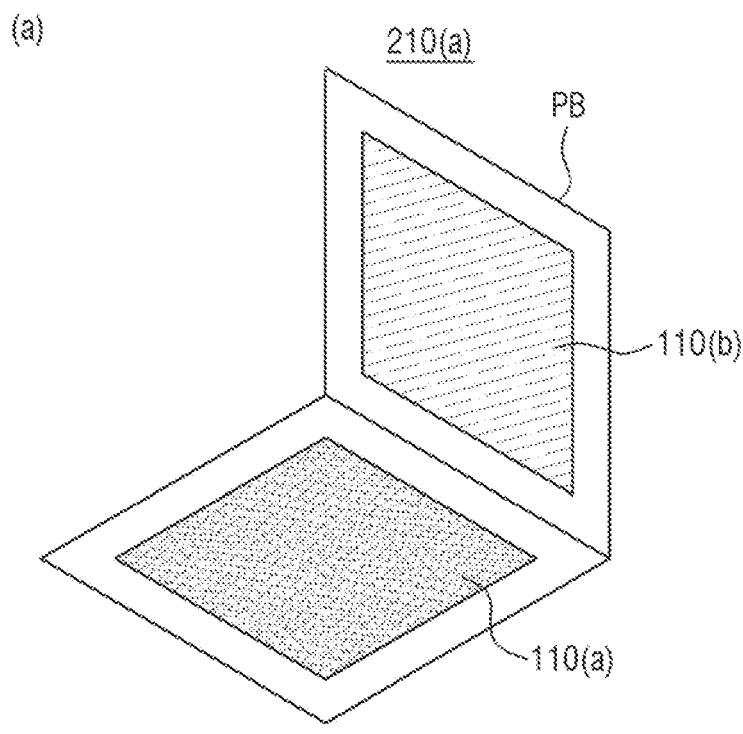
FIG. 20 is a perspective view illustrating a modified structure of image display devices of the first display module illustrated in FIGS. 16 through 18.
Figure 20:
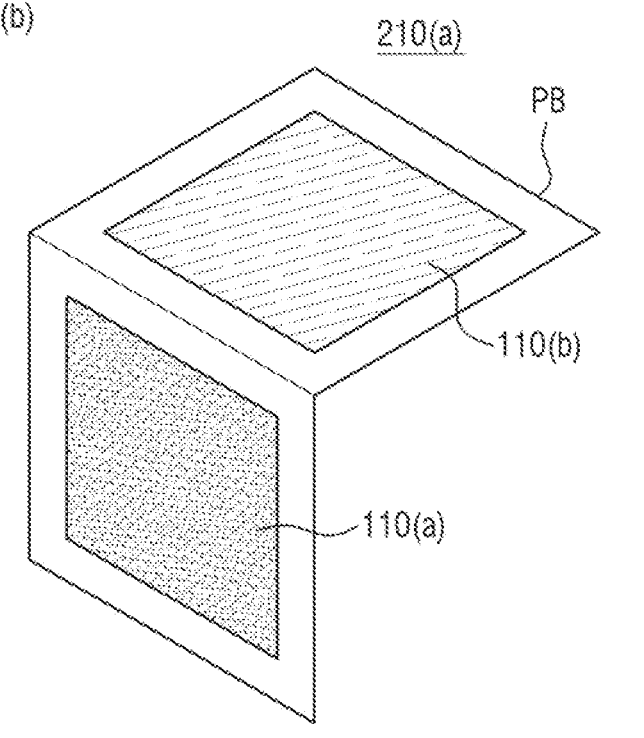

FIG. 20 is a perspective view illustrating a modified structure of the image display devices of the first display module illustrated in FIGS. 16 through 18.

Referring to FIG. 20, a circuit board PB of at least one display module 210(*a*) or 210(*b*), for example, a first display module 210(*a*) may be bent at a corresponding angle (e.g., a preset angle) so that first and second image display devices

110(*a*) and 110(*b*) located on the circuit board PB emit display light of a main image MI and display light of a background image SI at different respective angles. For example, (a) of FIG. 20 and (b) of FIG. 20 show cases of bending at different angles.

The first image display device 110(*a*) for displaying the main image MI, and the second image display device 110(*b*) for displaying the background image SI, may be formed to display the main image MI and the background image SI in different solid colors, respectively.

For example, the first image display device 110(*a*) for displaying the main image MI may be formed to display the main image MI only in any one solid color among red, green and blue colors, and the second image display device 110(*b*) displaying the background image SI may be formed to display the background image SI only in another solid color different from the color displayed by the first image display device 110(*a*) among the red, green and blue colors.

For another example, the first image display device 110(*a*) among the first and second image display devices 110(*a*) and 110(*b*) may be formed to display the main image MI by combining all of the red, green and blue colors, and the second image display device 110(*b*) may be formed to display the background image SI only in any one solid color among the red, green and blue colors.

In this way, by displaying the main image MI and the background image SI with different chromatic characteristics, such as chromaticity, chroma, and color sense, it is possible to further improve the 3D image display effect and efficiency.

Figure 21:
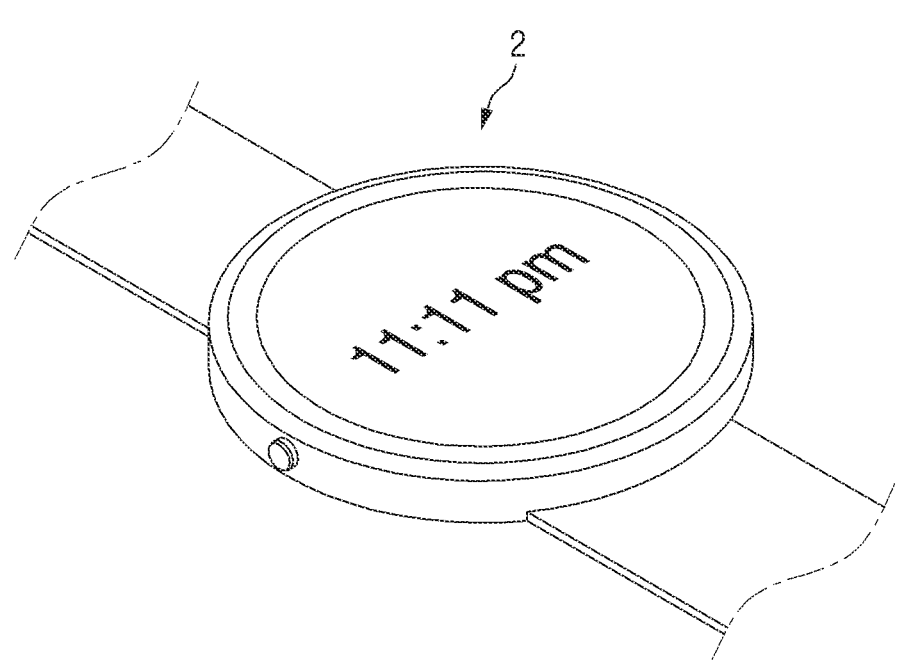
FIG. 21 is an view illustrating a watch-type smart device including a display module according to some embodiments.

FIG. 21 is an view illustrating a watch-type smart device 2 including a display module according to some embodiments.

Referring to FIG. 21, first and second image display devices 110(*a*) and 110(*b*) included in an AR-content-providing device 200 of the present disclosure may be applied to the watch-type smart device 2, which is one of smart devices. The watch-type smart device 2 according to some embodiments may also be applied to a head mounted display including a head mounted band that can be worn on the head. That is, the watch-type smart device 2 according to some embodiments is not limited to that illustrated in FIG. 20 and is applicable in various forms to various other electronic devices.

Figure 22:
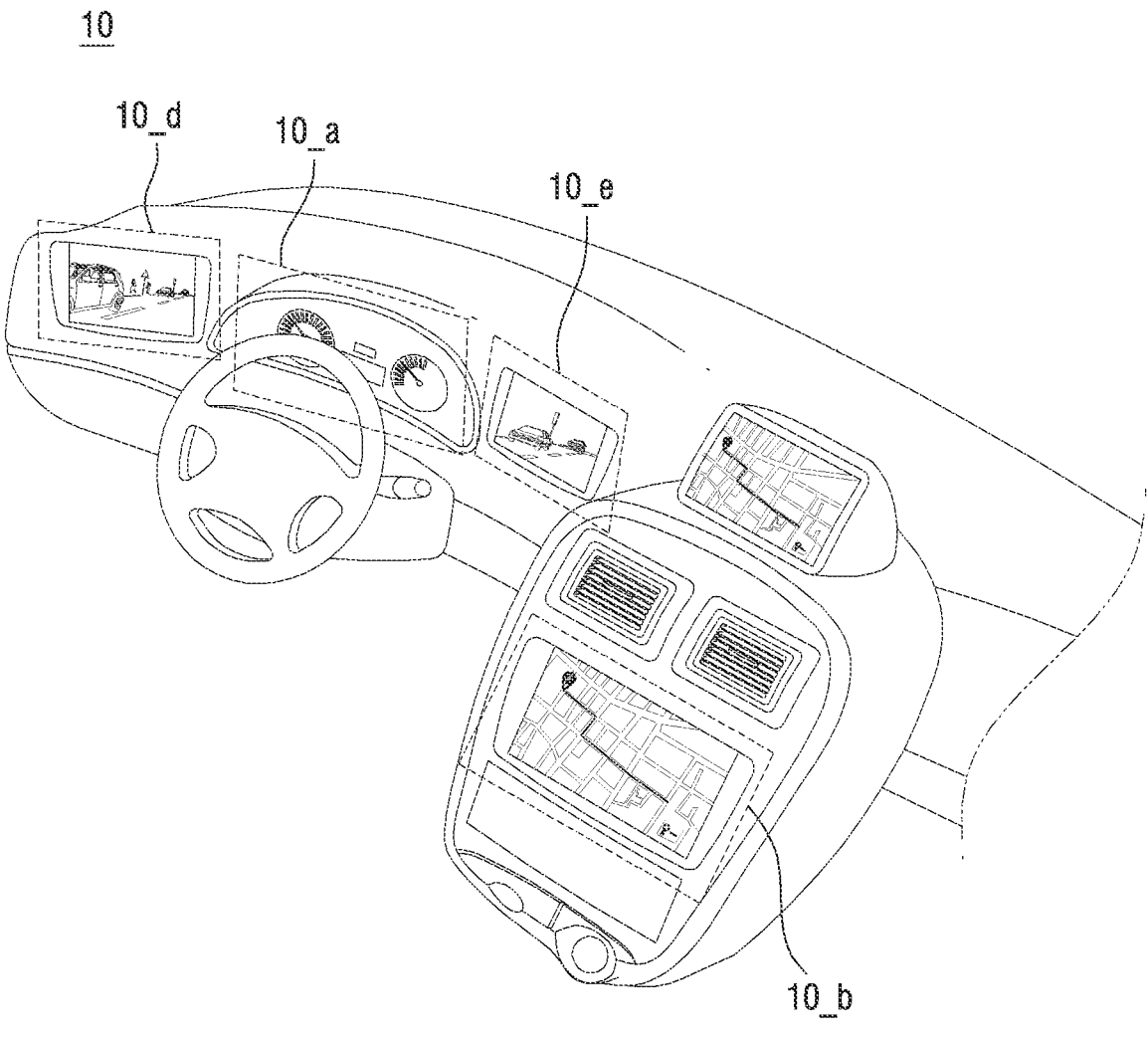
FIG. 22 is an view illustrating a dashboard and a center fascia of a vehicle including a display module according to some embodiments.

FIG. 22 is an view illustrating a dashboard and a center fascia of a vehicle including a display module according to some embodiments.

Referring to FIG. 22, first and second image display devices 110(*a*) and 110(*b*) included in an AR-content-providing device 200 of the present disclosure may be applied to a dashboard 10_a of a vehicle, a center fascia 10_b of the vehicle, or center information displays (CIDs) 10_d and 10_e located on the dashboard of the vehicle. In addition, the first and second image display devices 110(*a*) and 110(*b*) according to some embodiments may be applied to room mirror displays 10_d and 10_e that replace side mirrors of the vehicle, a navigation device, etc.

Figure 23:
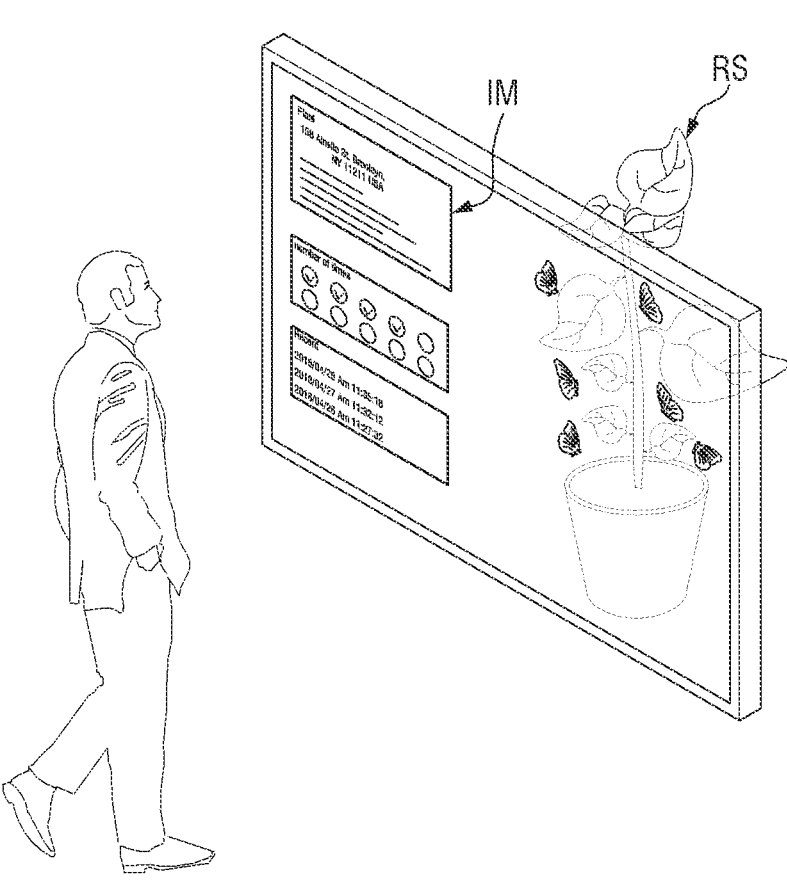
FIG. 23 is an view illustrating a transparent display device including a display module according to some embodiments.

FIG. 23 is an view illustrating a transparent display device including a display module according to some embodiments.

Referring to FIG. 23, first and second image display devices 110(*a*) and 110(*b*) included in an AR-content-providing device 200 of the present disclosure may be applied to the transparent display device. The transparent display device may transmit light while displaying an image IM. Therefore, a user located in front of the transparent display device may not only view the image IM displayed on the first and second image display devices 110(*a*) and 110(*b*), but may also view an object RS or the background located behind the transparent display device. When the first and second image display devices 110(*a*) and 110(*b*) are applied to the transparent display device, a display panel 212 of each of the first and second image display devices 110(*a*) and 110(*b*) illustrated in FIG. 10 may include a light transmitting part that can transmit light, or may be made of a material that can transmit light.

In concluding the detailed description, those skilled in the art will appreciate that many variations and modifications can be made to the disclosed embodiments without substantially departing from the aspects of the present disclosure. Therefore, the disclosed embodiments of the present disclosure are used in a generic and descriptive sense only and not for purposes of limitation.

What is claimed is:

1. An augmented reality (AR)-content-providing device comprising:
   at least one display module configured to separately display a background image and a main image; and
   at least one optical member configured to superimpose the background image and the main image on each other to be perceived as a three-dimensional (3D) image by a user's eyes, and comprising:
   a first optical panel forming a display light path of the main image; and
   a second optical panel forming a display light path of the background image,
   wherein the first and second optical panels comprise a flat plate shape and overlap each other so that a plane direction faces and corresponds to a direction of the user's eyes.

2. The AR-content-providing device of claim 1, wherein the first optical panel comprises at least one first grating coupler adjacent at least a part of a front surface or a rear surface thereof to form an optical waveguide of the display light path of the main image, and
   wherein the second optical panel comprises at least one second grating coupler adjacent at least a part of a front surface or a rear surface thereof to form an optical waveguide of the display light path of the background image.

3. The AR-content-providing device of claim 2, wherein an area or a width of the at least one first grating coupler inside the first optical panel is less than an area or a width of the at least one second grating coupler inside the second optical panel so that a light refraction width of the first optical panel is less than a light refraction width of the second optical panel.

4. The AR-content-providing device of claim 2, wherein the first optical panel further comprises first multi-stage reflective members forming a light refraction path with the at least one first grating coupler so that the display light path of the main image is refracted in the direction of the user's eyes, and
   wherein the second optical panel further comprises second multi-stage reflective members forming a light refraction path with the at least one second grating coupler so that the display light path of the background image is refracted in the direction of the user's eyes.

5. The AR-content-providing device of claim 1, wherein a thickness of the first optical panel is less than a thickness of the second optical panel so that the display light path of the main image is shorter than the display light path of the background image.

6. The AR-content-providing device of claim 1, wherein the second optical panel overlaps a rear surface of the first optical panel, and wherein a distance between the first and second optical panels is equal to or less than a thickness of the first optical panel or a thickness of the second optical panel.

7. The AR-content-providing device of claim 1, wherein an area or a width of the first optical panel is less than an area or a width of the second optical panel so that the display light path of the main image is shorter than the display light path of the background image.

8. The AR-content-providing device of claim 1, wherein the at least one display module is in a front circumferential direction area of, on a side of, or diagonally in front of, the first and second optical panels to provide the main image and the background image to front peripheral areas of the first and second optical panels, respectively.

9. The AR-content-providing device of claim 8, wherein the at least one display module comprises:

a first image display device on a circuit board to display the main image in a direction of the first optical panel, thereby providing the main image to the first optical panel; and a second image display device side by side with the first image display device and on the circuit board to display the background image in a direction of the second optical panel, thereby providing the background image to the second optical panel.

10. The AR-content-providing device of claim 9, wherein the at least one display module is formed such that the main image and the background image are configured to be emitted at respective emission angles, such that the main image is incident on the first optical panel in a diagonal lateral direction, and such that the background image is straightly incident on the front peripheral area of the second optical panel.

11. The AR-content-providing device of claim 9, wherein the first and second image display devices are configured to display the main image and the background image in different respective solid colors, or wherein the first image display device is configured to display the main image by combining red, green and blue colors, and wherein the second image display device is configured to display the background image only in any one solid color among the red, green, and blue colors.

12. The AR-content-providing device of claim 9, wherein the first and second image display devices are configured to be set to different respective levels of at least one of resolution, display luminance, or brightness, and are configured to be set to different respective levels of at least one of chromaticity, chroma, or color sense.

13. The AR-content-providing device of claim 9, wherein the first and second image display devices comprise:

a partition wall on a substrate in an RGBG matrix structure;

light-emitting elements in respective light-emitting areas arranged in the RGBG matrix structure, and extending in a thickness direction of the substrate;

a base resin in the light-emitting areas; and optical patterns on at least one of the light-emitting areas.

14. The AR-content-providing device of claim 13, wherein the light-emitting areas comprise a first light-emitting area, a second light-emitting area, and a third light-emitting area or the first light-emitting area, the second light-emitting area, the third light-emitting area, and a fourth light-emitting area in each pixel area.

15. The AR-content-providing device of claim 14, wherein the first light-emitting area comprises a first light-emitting element for emitting first light in a wavelength band that realizes any one of red, green, or blue colors, wherein the second light-emitting area comprises a second light-emitting element for emitting second light in a wavelength band that realizes any one color that is different from the first light among the red, green, or blue colors, wherein the third light-emitting area comprises a third light-emitting element for emitting third light in a wavelength band that realizes any one color that is different from the first light and the second light among the red, green, or blue colors, and wherein the fourth light-emitting area comprises a fourth light-emitting element for emitting fourth light in a same wavelength band as any one of the first light, the second light, or the third light.

16. The AR-content-providing device of claim 14, wherein the first light-emitting area, the second light-emitting area, the third light-emitting area, and the fourth light-emitting area have a same size or planar area, and wherein a distance between the first light-emitting area and the second light-emitting area, a distance between the second light-emitting area and the third light-emitting area, a distance between the first light-emitting area and the third light-emitting area, and a distance between the third light-emitting area and the fourth light-emitting area, are the same.

17. The AR-content-providing device of claim 14, wherein respective ones of the first light-emitting area, the second light-emitting area, the third light-emitting area, and the fourth light-emitting area have different sizes or planar areas.

18. An augmented reality (AR)-content-providing device comprising:

a support frame supporting at least one transparent lens;

at least one display module configured to display a background image and a main image separately;

at least one optical member integrally formed with the at least one transparent lens, and forming a display light path of the background image and a display light path of the main image, so that the background image and the main image displayed separately on the at least one display module are superimposed on each other; and a control module configured to separate image data of AR content into background image data and main image data, and configured to provide the background image data and the main image data to the at least one display module.

19. The AR-content-providing device of claim 18, wherein the at least one optical member is embedded in a surface of, and is integrally formed with, the transparent lens comprising integrated left and right sides, or is embedded in a surface of, and is integrally formed with, the transparent lens comprising separated first and second transparent lenses, and wherein the at least one optical member comprises the display light path of the background image and the display light path of the main image so that the background image and the main image are superimposed on each other.

20. An electronic device comprising an augmented reality (AR)-content-providing device, wherein the augmented reality (AR)-content-providing device comprises:

at least one display module configured to separately display a background image and a main image; and at least one optical member comprising respective display light paths of the background image and the main image so that the background image and the main image are superimposed on each other to be perceived as a three-dimensional (3D) image by a user's eyes, wherein the at least one optical member comprises:

a first optical panel forming the display light path of the main image; and a second optical panel forming the display light path of the background image, and wherein the first optical panel and the second optical panel comprise a flat plate shape, and overlap each other so that a plane direction faces and corresponds to a direction of the user's eyes.

* * * * *